(12) United States Patent
Tsubata et al.

(10) Patent No.: US 7,266,809 B2
(45) Date of Patent: Sep. 4, 2007

(54) SOFTWARE DEBUGGER AND SOFTWARE DEVELOPMENT SUPPORT SYSTEM FOR MICROCOMPUTER OPERABLE TO EXECUTE CONDITIONAL EXECUTION INSTRUCTION

(75) Inventors: Shintaro Tsubata, Suita (JP); Kiyohiko Sumida, Takatsuki (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 648 days.

(21) Appl. No.: 10/210,206

(22) Filed: Aug. 2, 2002

(65) Prior Publication Data

US 2003/0033592 A1    Feb. 13, 2003

(30) Foreign Application Priority Data

Aug. 6, 2001    (JP)    ............................. 2001-238031

(51) Int. Cl.
G06F 9/44    (2006.01)
(52) U.S. Cl. ..................................... 717/129; 717/124
(58) Field of Classification Search ................ 717/129, 717/124, 125, 126, 127, 128; 714/34, 35
See application file for complete search history.

(56) References Cited

U.S. PATENT DOCUMENTS 5,175,856 A * 12/1992 Van Dyke et al. ........... 717/151
5,687,375 A * 11/1997 Schwiegelshohn .......... 717/129
6,016,555 A *  1/2000 Deao et al. .................. 714/35
6,091,896 A *  7/2000 Curreri et al. ............... 717/125
6,158,045 A * 12/2000 You ............................. 717/124

(Continued)

FOREIGN PATENT DOCUMENTS

JP    2892978    9/1996

(Continued)

OTHER PUBLICATIONS

"Turbo Debugger 3.0 User's Guide", Borland, 1991, pp. 125-152.*

(Continued)

*Primary Examiner*—Todd Ingberg
(74) *Attorney, Agent, or Firm*—Stevens, Davis, Miller & Mosher, LLP

(57) ABSTRACT

A software debugger tangibly embodied on a computer readable medium may display a microcomputer program being debugged so that a halt address at which the execution of the program is caused to halt can be distinguished from other addresses. When performing step-by-step execution of the program, a determination is made whether an instruction at the halt address is a predicate execution instruction or not. If the instruction is a predicate execution instruction, a condition flag value for the instruction is acquired. Based on the condition flag value, a determination is made whether the predicate execution instruction is to be executed or not. Then, the instruction at the halt address is displayed on a screen by changing a display method according to the result of the determination.

7 Claims, 30 Drawing Sheets

U.S. PATENT DOCUMENTS

| | | | |
|---|---|---|---|
| 6,260,189 B1* | 7/2001 | Batten et al. | 717/151 |
| 6,493,868 B1* | 12/2002 | DaSilva et al. | 717/105 |
| 6,516,408 B1* | 2/2003 | Abiko et al. | 712/227 |
| 6,571,385 B1* | 5/2003 | Muthukumar et al. | 717/150 |
| 6,681,384 B1* | 1/2004 | Bates et al. | 717/129 |
| 6,820,250 B2* | 11/2004 | Muthukumar et al. | 717/116 |
| 6,832,370 B1* | 12/2004 | Srinivasan et al. | 717/161 |
| 6,839,893 B2* | 1/2005 | Bates et al. | 717/124 |
| 6,848,097 B1* | 1/2005 | Alverson et al. | 717/124 |
| 6,912,709 B2* | 6/2005 | Helder et al. | 717/161 |
| 6,922,826 B2* | 7/2005 | Bates et al. | 717/129 |
| 6,971,089 B2* | 11/2005 | Bates et al. | 717/131 |
| 7,000,225 B2* | 2/2006 | Sangavarapu et al. | 717/129 |
| 7,007,267 B2* | 2/2006 | Hunter et al. | 717/124 |
| 7,007,268 B2* | 2/2006 | Emberson | 717/127 |

FOREIGN PATENT DOCUMENTS

| | | |
|---|---|---|
| JP | 08235020 | 9/1996 |

OTHER PUBLICATIONS

"How Debuggers Work Algorithms, Data Structures and Architecture", Jonathan B. Rosenberg, 1996, pp. 1-256.*

Mesa Debugger Documentation version 5.0, XEROX, Apr. 1979, Whole Manual.*

Working in GDB, John Gilmore et al, 1994, pp. 1-48.*

Debugging with GDB, Richard M. Stallman et al, Jan. 1994, pp. 1-193.*

* cited by examiner

FIG. 5

```
01:     if (a == 10) {
02:         b = a * a;
03:     } else {
04:         b = c;
05:     }
06:     d = 1;
```

FIG. 6

```
0x400:    cmp Ra==10, c0
0x404:    (c0)  mul Ra, Ra, Rb
0x408:    (!c0) mov Rc, Rb
0x40c:    mov 1, Rd
```

FIG. 7A

```
0x400:      cmp Ra==10, c0
0x404:      (c0)  mul Ra, Ra, Rb
0x408:      (!c0) mov Rc, Rb
0x40c:      mov 1, Rd
```

FIG. 7B

```
0x400:      cmp Ra==10, c0
0x404:      (c0)  mul Ra, Ra, Rb
0x408:      (!c0) mov Rc, Rb
0x40c:      mov 1, Rd
```

FIG. 7C

```
0x400:      cmp Ra==10, c0
0x404:      (c0)  mul Ra, Ra, Rb
0x408:      (!c0) mov Rc, Rb
0x40c:      mov 1, Rd
```

FIG. 7D

```
0x400:      cmp Ra==10, c0
0x404:      (c0)  mul Ra, Ra, Rb
0x408:      (!c0) mov Rc, Rb
0x40c:      mov 1, Rd
```

FIG. 13A

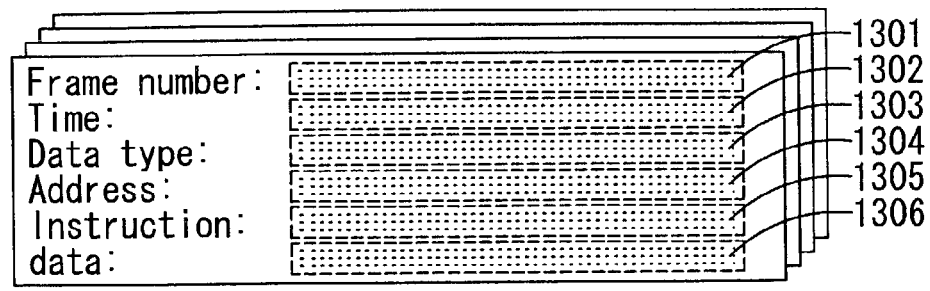

```
Frame number:    ──1301
Time:            ──1302
Data type:       ──1303
Address:         ──1304
Instruction:     ──1305
data:            ──1306
```

FIG. 13B

1307 —
```
Frame number: 100
Time:         300
Data type:    Execution instruction
Address:      0x400
Instruction:  cmp Ra==10, c0
data:         ---
```

1308 —
```
Frame number: 101
Time:         300
Data type:    Condition execution flag c0
Address:      0x400
Instruction:  ---
data:         1
```

1309 —
```
Frame number: 102
Time:         301
Data type:    Execution instruction
Address:      0x404
Instruction:  (c0)mul Ra, Ra, Rb
data:         ---
```

1310 —
```
Frame number: 103
Time:         302
Data type:    Execution instruction
Address:      0x408
Instruction:  (!c0)mov Rc, Rb
data:         ---
```

1311 —
```
Frame number: 104
Time:         303
Data type:    Execution instruction
Address:      0x40C
Instruction:  mov 1, Rd
data:         ---
```

```
0x400:    cmp Ra==10, c0
0x404:    (c0)    mul Ra, Ra, Rb
0x408:    (!c0)   < mov Rc, Rb >
0x40c:    mov 1, Rd
```

F I G. 1 6
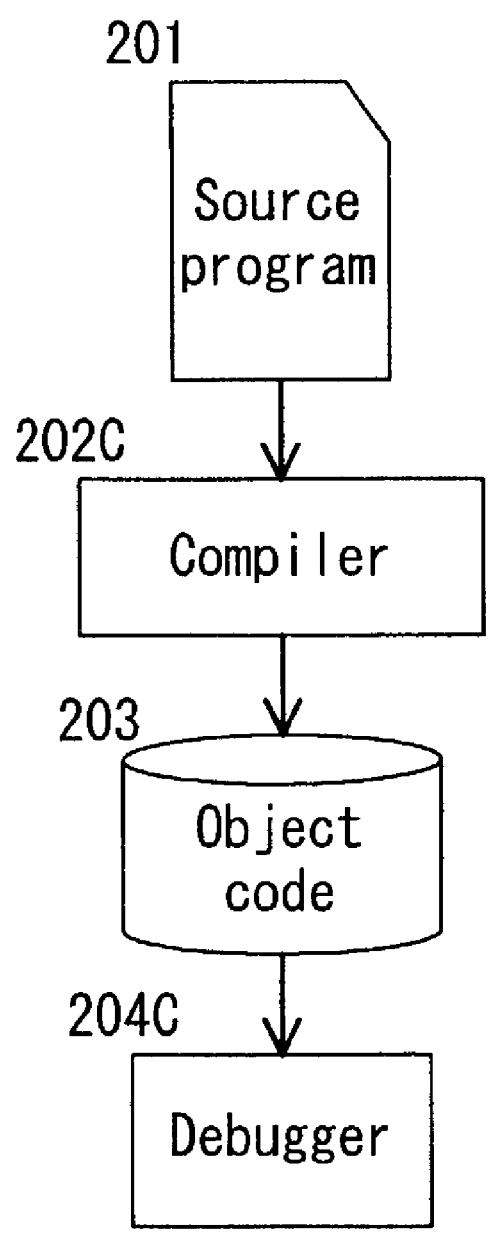

FIG. 19

| No. | Instruction code | UD List | | | | | | DU List | | | | | |
|---|---|---|---|---|---|---|---|---|---|---|---|---|---|
| | | Ra | Rb | Rc | Rd | c0 | c1 | Ra | Rb | Rc | Rd | c0 | c1 |
| 0 | mov 2, Rc | | | | | | | | | 4 | | | |
| 1 | mov 1, Ra | | | | | | | 2, 3, 6 | | | | | |
| 2 | cmp Ra==10, c0 | 1 | | | | | | | | | | 3, 4 | |
| 3 | (c0) mul Ra, Ra, Rb | 1 | | | | 2 | | | | | | | |
| 4 | (!c0) mov Rc, Rb | | | 0 | | 2 | | | | 0 | | | |
| 5 | mov 1, Rd | | | | | | | | | | 6 | | |
| 6 | sub Rd, Ra, Rc | 1 | | | 5 | | | | | | | | |

1901 1902 1903 1904

FIG. 24A
c0=1, Halt address=0x404

```
0x400:     cmp Ra==10, c0
0x404:     (c0)   mul Ra, Ra, Rb
0x408:     (!c0)  mov Rc, Rb
0x40c:     mov 1, Rd
```

FIG. 24B
c0=1, Halt address=0x408

```
0x400:     cmp Ra==10, c0
0x404:     (c0)   mul Ra, Ra, Rb
0x408:     (!c0)  mov Rc, Rb
0x40c:     mov 1, Rd
```

FIG. 24C
c0=0, Halt address=0x404

```
0x400:     cmp Ra==10, c0
0x404:     (c0)   mul Ra, Ra, Rb
0x408:     (!c0)  mov Rc, Rb
0x40c:     mov 1, Rd
```

FIG. 24D
c0=0, Halt address=0x408

```
0x400:     cmp Ra==10, c0
0x404:     (c0)   mul Ra, Ra, Rb
0x408:     (!c0)  mov Rc, Rb
0x40c:     mov 1, Rd
```

FIG. 25

| Instruction format | Mnemonics | Cycle | Conditional | Flag update |
|---|---|---|---|---|
| 0000 0000 ⟨R1⟩ ⟨R3⟩ ⟨R2⟩ 0000 0000 0000 | "add⟨R1⟩, ⟨R2⟩, ⟨R3⟩" | 1 | No | No |
| 0000 0001 ⟨R1⟩ ⟨R3⟩ ⟨R2⟩ ⟨cc⟩ 0000 0000 | "(⟨cc⟩), add⟨R1⟩, ⟨R2⟩, ⟨R3⟩" | 1 | Yes | No |
| 0001 0000 ⟨R1⟩ ⟨R3⟩ ⟨imm16------→ | "add⟨R1⟩, imm16, ⟨R3⟩" | 1 | No | No |
| 0000 0010 ⟨R1⟩ ⟨R3⟩ ⟨R2⟩ 0000 0000 0000 | "sub⟨R1⟩, ⟨R2⟩, ⟨R3⟩" | 1 | No | No |
| 0000 0011 ⟨R1⟩ ⟨R3⟩ ⟨R2⟩ ⟨cc⟩ 0000 0000 | "(⟨cc⟩), sub⟨R1⟩, ⟨R2⟩, ⟨R3⟩" | 1 | Yes | No |
| 0001 0010 ⟨R1⟩ ⟨R3⟩ ⟨imm16------→ | "sub⟨R1⟩, imm16, ⟨R3⟩" | 1 | No | No |
| 0000 0010 ⟨R1⟩ 0000 ⟨R2⟩ 0000 0000 0000 | "mov⟨R1⟩, ⟨R2⟩" | 1 | No | No |
| 0000 0011 ⟨R1⟩ 0000 ⟨R2⟩ ⟨cc⟩ 0000 0000 | "(⟨cc⟩), mov⟨R1⟩, ⟨R2⟩" | 1 | Yes | No |
| 0001 0010 ⟨R1⟩ 0000 ⟨imm16------→ | "mov imm16, ⟨R1⟩" | 1 | No | No |
| 0001 0100 ⟨R1⟩ ⟨Rc⟩ ⟨imm16------→ | "cmp⟨R1⟩==⟨imm16⟩, ⟨Rc⟩" | 1 | No | Yes |

FIG. 30A

```
0x400:     cmp Ra==10, c0
0x404:     (c0)  mul Ra, Ra, Rb
0x408:     (!c0) mov Rc, Rb
0x40c:     mov 1, Rd
```

PRIOR ART

FIG. 30B

```
0x400:     cmp Ra==10, c0
0x404:     (c0)  mul Ra, Ra, Rb
0x408:     (!c0) mov Rc, Rb
0x40c:     mov 1, Rd
```

PRIOR ART

FIG. 30C

```
0x400:     cmp Ra==10, c0
0x404:     (c0)  mul Ra, Ra, Rb
0x408:     (!c0) mov Rc, Rb
0x40c:     mov 1, Rd
```

PRIOR ART

FIG. 30D

```
0x400:     cmp Ra==10, c0
0x404:     (c0)  mul Ra, Ra, Rb
0x408:     (!c0) mov Rc, Rb
0x40c:     mov 1, Rd
```

PRIOR ART

SOFTWARE DEBUGGER AND SOFTWARE DEVELOPMENT SUPPORT SYSTEM FOR MICROCOMPUTER OPERABLE TO EXECUTE CONDITIONAL EXECUTION INSTRUCTION

BACKGROUND OF THE INVENTION

1. Field of the Invention

The present invention relates to a software debugger for debugging a program to be executed on a microcomputer, and a software development support system using the same; more particularly, the invention relates to a method of displaying the executing process of a microcomputer program having conditional execution instructions.

2. Description of the Related Art

With recent advances in electronic technology, increasing numbers of consumer appliances such as household electrical appliances have come to be equipped with built-in microcomputers, and the development of appliances entailing program development has become widespread.

Furthermore, with increasing functionality of household electrical appliances, high performance microcomputers having conditional execution instructions for faster program execution have come to be used.

In the development of a program, the program developer debugs the program by using a debugger and checking whether the developed program is functioning as designed. In debugging, it has been practiced to check the operation of the program by using debugger functions such as a step execution function, which steps through the program by executing one instruction at a time, and a trace function, which displays the sequence of program execution results.

FIG. 26 shows the configuration of a software development support system according to the prior art. Reference numeral 201 is a C source program, using which the software developer implements an application system being developed. Reference numeral 202 is a compiler, which takes the C source program 201 as an input, and outputs an object file 203 containing debugging information and microcomputer executable code used in the application system being developed. Reference numeral 204 is a debugger, which takes the object file 203 as an input, accepts commands from the software developer through a user interface, and performs debugging by checking the operation of the program being debugged.

The operation of the debugger 204 of the prior art will be described below. FIG. 27 shows a functional block diagram of the debugger 204.

Reference numeral 301 is a debugger processing section, which processes input/output operations, such as an input of a debugger command from the software developer as the user and the display or output of information for presentation to the user, and which performs processing in response to the debugger command thus input.

Reference numeral 302 is an execution target environment on which the program of the object file 203 is executed, and which is, for example, a microcomputer simulator implemented on a computer. Alternatively, the execution target environment may be implemented using an evaluation board on which the target microcomputer or a memory is mounted. The debugger processing section 301 realizes the debugging functions by controlling the execution target environment 302.

Reference numeral 303 is object code information which is the information stored in the debugger 204 by reading therein the object file 203, i.e., the program to be debugged, in accordance with an instruction from the user.

Reference numeral 304 is the debugging information containing various kinds of information necessary for debugging. This information is stored in the object file 203, and is read into the debugger. The contents include, for example, information for associating symbols such as function names and variable names with addresses, line number information for associating addresses with source lines in the C language program, and location information indicating the resource, such as a register or a memory, to which each variable is assigned.

Reference numeral 305 is instruction type information which is the information for associating instruction code with an instruction type, and includes information about mnemonic character strings in assemble form. By referring to this information, disassembling can be achieved from a memory value which is an instruction code on a memory.

Reference numeral 306 is trace data information in which trace frame data for outputting a trace is stored.

FIG. 28 shows a process flow of the prior art debugger. When the debugger 204 is activated, initialization is performed in step S401 to initialize the working memory of the debugger, draw a display window, etc.

Next, in step S402, a debugger command is accepted from the user. Here, the user enters a command for reading the object code of the program to be debugged or a command necessary for debugging, such as a program execution start command, a breakpoint setup command, or a memory dump command.

Next, in step S403, the entered command is interpreted, and in step S404, processing is performed for the entered command. The method of command execution is well known in the art and will be not described in detail here.

Next, in step S405, the debugger display is updated. The display update process includes, for example, updating the display contents of the code display window so as to display the codes before and after the address at which the program execution is caused to halt, and updating the display contents of the memory window so as to reflect changes in memory contents.

When a terminate command is entered in step S404, the terminating process, such as freeing the debugger working area and cutting the connection to the execution target environment, is performed in step S406.

FIG. 29 shows the process flow of the display update process in step S405. In the display update process, necessary processing is performed whenever there arises a need to update the display.

In step S2801, the execution state of the program being debugged is examined on the execution target environment, and if the execution is halted, the process proceeds to step S2802. If the execution of the program is not halted, but is continuing, the process is terminated since there is no need to update the display. On the other hand, if the execution is halted, the following steps are carried out to produce a display indicating to the program developer at which point in the program being debugged the execution is caused to halt.

In step S2802, the halt address of the program being debugged is acquired. That is, the register value of the program counter (PC) of the microcomputer on the execution target environment 302 is acquired.

Next, in step S2803, instruction code at the halt address acquired in step S2802 is read from the object code information 303 stored in the debugger.

In step S2804, the instruction code is disassembled to obtain an assemble line character string corresponding to the instruction code. The disassembling is done by referring to the instruction type information 305 managed in the debugger.

Next, in step S2805, the obtained assemble line character string is displayed in reverse video on the screen, and the line previously displayed in reverse video is now displayed in normal video.

Finally, in step S2806, the display of memory contents, etc., other than the instruction code display, is updated.

In the thus configured debugger, when the program developer enters, for example, a step execution command consecutively, program instructions being executed are sequentially displayed in reverse video, and the developer can thus debug the program while viewing the executing process of the program being debugged.

In "Software Trace Generation Method and Apparatus" trace to display the executing process of a program, executed instructions are displayed in different colors according to the order of execution, thus presenting the executing process of the program in an easy-to-view form.

However, in a microcomputer having conditional execution instructions, conditional execution traditionally implemented with a plurality of instructions can be implemented with one conditional execution instruction. As a result, traditionally, it has been possible to check the program executing process by tracking the instructions as they are executed, but in the case of conditional execution instructions, there arises the problem that by just tracking the executed instructions only, it is difficult to check the executing process.

A method of displaying the executing process in the prior art debugger will be described below by dealing with a program using a conditional execution instruction.

FIG. 5 shows a portion of a C language program to be debugged. Here, "01:", "02:", etc. are line numbers shown for purposes of explanation. In this program, the instruction on line 02 or 04 is executed according to the value of a variable "a" in the conditional statement.

FIG. 6 shows the result of assembling the C language program into microcomputer instruction code having a conditional execution instruction. Here, "0x400:", "0x404:", etc. indicate the addresses at which instructions are placed. In this example, the if-else condition execution structure in the C language is implemented using a conditional execution instruction.

At address 0x400, the value of register Ra is compared with 10, and the result is placed into flag c0. At address 0x404, if the flag c0 is true, the square of the value of the register Ra is transferred into register Rb. If the flag c0 is false, the instruction does nothing.

At address 0x408, if the flag c0 is false, the contents of register Rc are transferred into the register Rb. If the flag c0 is true, nothing is done. The sequence of instructions from address 0x400 to address 0x408 in FIG. 6 corresponds to the logic structure described by the if-else statement from line 01 to line 05 in FIG. 5.

A description will be given below for the case where the user, using the prior art debugger, checks the operation of the above C language program from address 0x400 to address 0x408 in a step execution mode.

It is assumed here that the execution of the program being debugged is halted at address 0x400. In this case, the assemble line at the halt address 0x400 is displayed in reverse video on the code display screen, as shown in FIG. 30A.

The user enters a step execute command in step S402.

In step S403, the entered command is interpreted, and necessary information, such as the information indicating that the type of the command is step execution, is extracted.

In step S404, step execution is performed based on the information extracted in step S403. The step execution is accomplished by performing control so that the execution target environment 302, a microcomputer simulator, executes one instruction. As a result, one instruction in the program being debugged is executed from the halt address on the execution target environment 302, and then the execution halts.

To update the display in step S405, the process proceeds to step S2801.

In step S2801, it is determined whether the execution is halted or not. Since the execution is halted, the process proceeds to step S2802.

In step S2802, the halt address is acquired by referring to the program counter (PC) value of the microcomputer simulator which is the execution target environment 302. In this case, 0x404 is obtained as the halt address.

Next, in step S2803, the instruction code at the halt address 0x404 is read from the object code information 303, and in step S2804, the instruction code is disassembled by referring to the instruction type information 305, to obtain an assemble line "(c0) mul Ra, Ra, Rb" as the resulting character string.

In step S2805, the display is updated to display the assemble line "(c0) mul Ra, Ra, Rb" in reverse video. At the same time, the assemble line previously displayed in reverse video is displayed in normal video. An example of the resulting display is shown in FIG. 30B.

The step execution is repeated in the same manner. Examples of the resulting displays are shown in FIGS. 30C and 30D.

The executing process of the program can be checked by viewing the assemble lines being sequentially displayed in reverse video. However, it is difficult to check if the processing "mul Ra, Ra, Rb" specified by the instruction at address 0x404 and the processing "mov Rc, Rb" specified by the instruction at address 0x408 have actually been executed.

The resulting problem is that it is difficult to check the program logic described by the if-else control structure.

The same problem occurs when displaying the results of a trace.

SUMMARY OF THE INVENTION

In view of the above problem, it as an object of the present invention to provide a software debugger and a software development support system that can present the executing process of a program's conditional logic structure implemented by a conditional execution instruction, for viewing to the user in an easy-to-view form.

According to a first invention, there is provided a software debugger which displays a microcomputer program being debugged, for viewing on a screen in such a way that a halt address at which the execution of the program is caused to halt can be distinguished from other addresses, the software debugger including the functions of: when performing step-by-step execution of the program, determining whether an instruction at the halt address is a conditional execution instruction or not; if the instruction is a conditional execution instruction, then acquiring a condition flag value for the instruction; determining, based on the condition flag value, whether the conditional execution instruction is to be executed or not; and displaying the instruction at the halt address on the screen by changing display method according to the result of the determination.

According to the above configuration, if the conditional execution is not executed because the condition is not satisfied the result can be presented to the user by changing display method so that the user can easily check the executing process of the program containing the conditional execution instruction.

In the configuration of the first invention, preferably the software debugger further includes the function of displaying a halt address part in reverse video when displaying the instruction at the halt address on the screen by changing display method according to the result of the determination made as to whether the conditional execution instruction is to be executed or not (second invention). Or, preferably the software debugger further includes the function of displaying a halt address part and a condition flag part in reverse video when displaying the instruction at the halt address on the screen by changing display method according to the result of the determination made as to whether the conditional execution instruction is to be executed or not (third invention).

According to a fourth invention, there is provided a software debugger which, after executing a microcomputer program for debugging, outputs a trace of instructions executed in the program, the software debugger including the functions of: outputting an updated flag value as trace data if an executed instruction is a flag update instruction; determining whether an instruction whose trace is to be output is a conditional execution instruction or not; acquiring the flag value output as the trace data if the result of the determination shows that the instruction whose trace is to be output is a conditional execution instruction; determining, based on the flag value, whether the conditional execution instruction is to be executed or not; and outputting the trace of the instruction by changing trace output method according to the result of the determination.

According to the above configuration, the condition flag value can be referred to in the trace output to check the result of the execution of the conditional execution instruction, and if the conditional execution is not executed because the condition is not satisfied, the result can be presented to the user by changing display method so that the user can easily check the executing process of the program containing the conditional execution instruction.

According to a fifth invention, there is provided a software development support system which displays a microcomputer program being debugged, for viewing on a screen in such a way that a halt address at which the execution of the program is caused to halt can be distinguished from other addresses, the software development support system including the functions of: detecting the live range of a condition flag for all conditional execution instructions from the program being debugged; determining whether an instruction at an address to be displayed is a conditional execution instruction or not; if the result of the determination shows a conditional execution instruction, then determining whether the address to be displayed and the halt address are both in the same live range of the condition flag that is referred to by the conditional execution instruction; if the result of the determination shows a conditional execution instruction, then acquiring the value of the condition flag that is referred to by the conditional execution instruction; determining, based on the condition flag value, whether the conditional execution instruction is to be executed or not; and displaying on the screen the instruction at the halt address and instructions at addresses before and after the halt address by changing display method according to the result of the determination made as to whether the address to be displayed and the halt address are both in the same live range of the condition flag that is referred to by the conditional execution instruction, and to the result of the determination made based on the condition flag value as to whether the conditional execution instruction(s) is to be executed or not.

According to the above configuration, when producing a display at the time the program execution is caused to halt, if the address is within the live range of the condition flag, the execution state of the conditional execution instruction is checked, and the result can be presented to the user by changing display method so that the user can easily check the executing process of the program containing the conditional execution instruction.

According to a sixth invention, there is provided a compiler for a microcomputer, including the functions of: detecting the live range of a condition flag for a conditional execution instruction contained in an instruction sequence; and outputting information concerning the detected live range of the condition flag.

According to a seventh invention, there is provided a software debugger which displays a microcomputer program being debugged, for viewing on a screen in such a way that a halt address at which the execution of the program is caused to halt can be distinguished from other addresses, the software debugger including the functions of: determining whether an instruction at an address to be displayed is a conditional execution instruction or not; if the result of the determination shows a conditional execution instruction, then determining whether the address to be displayed is in the live range of a condition flag that is referred to by the conditional execution instruction; if the result of the determination shows a conditional execution instruction, then acquiring the value of the condition flag that is referred to by the conditional execution instruction; determining, based on the condition flag value, whether the conditional execution instruction is to be executed or not; and displaying on the screen the instruction at the halt address and instructions at addresses before and after the halt address by changing display method according to the result of the determination made as to whether the address to be displayed is in the live range of the condition flag, and to the result of the determination made based on the condition flag value as to whether the conditional execution instruction is to be executed or not.

According to an eighth invention, the software debugger of the seventh invention further includes the function of accepting the condition flag live range information output from the compiler of the sixth invention.

The software development support system of the fifth invention can be constructed using the compiler of the sixth invention and the software debugger of the seventh or eighth invention.

According to a ninth invention, there is provided a machine readable recording medium having recorded thereon machine code of a microcomputer program and a storage address thereof, and information concerning a defined address and reference address of a condition flag for a conditional execution instruction.

BRIEF DESCRIPTION OF THE DRAWINGS

FIG. 5 is a diagram showing a portion of a C language program to be debugged.

FIG. 6 is a diagram showing an assemble example corresponding to the portion of the C language program to be debugged.

FIGS. 7A to 7D are diagrams showing screen examples during a step execution process according to the first embodiment of the present invention.

FIG. 13A is a diagram for explaining trace frame data according to the second embodiment of the present invention.

FIG. 13B is a diagram showing trace frame data examples according to the second embodiment of the present invention.

FIG. 16 is a diagram showing the configuration of a software development support system according to a third embodiment of the present invention.

FIG. 19 is a diagram for explaining use defining chain information according to the third embodiment of the present invention.

FIGS. 24A to 24D are diagrams showing display examples at the time of an execution halt according to the third embodiment of the present invention.

FIG. 25 is a diagram for explaining instruction type information according to an embodiment of the present invention.

FIGS. 30A to 30D are diagrams showing screen examples during a step execution process according to the prior art.

DESCRIPTION OF THE PREFERRED EMBODIMENTS

Embodiments of the present invention will be described with reference to the accompanying drawings.

Embodiment 1

Figure 2:
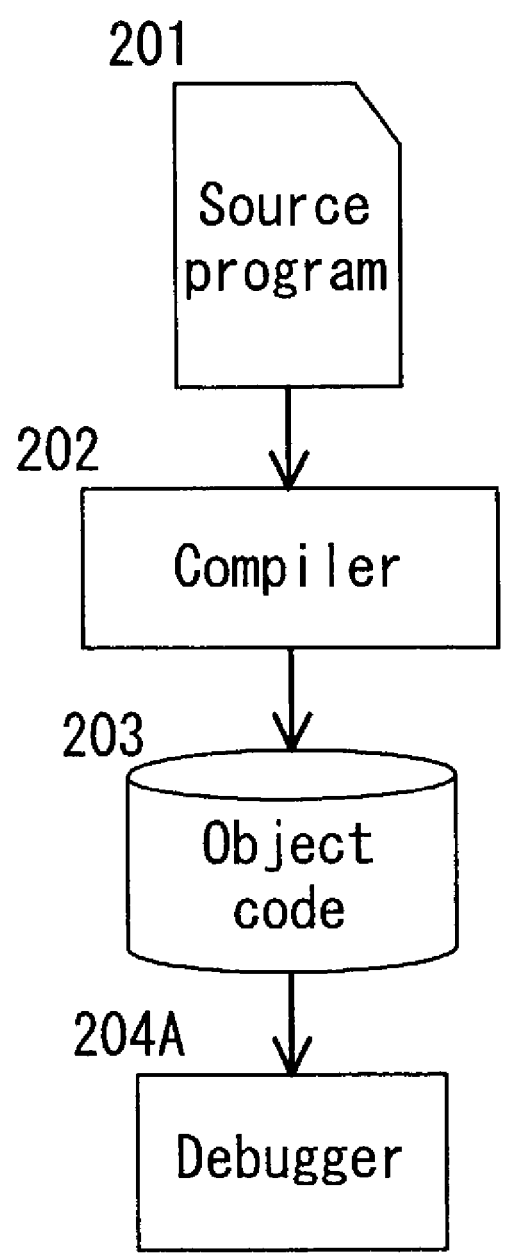
FIG. 2 is a diagram showing the configuration of a software development support system according to the first embodiment of the present invention.

First, a first embodiment will be described below. FIG. 2 shows the configuration of a software development support system according to the first embodiment of the present invention. Reference numeral 201 is a C source program, using which a software developer as the user implements an application system being developed. Reference numeral 202 is a compiler, which takes the C source program 201 as an input, and outputs an object file 203 containing debugging information and microcomputer executable code used in the application system being developed. Reference numeral 204A is a debugger, which takes the object file 203 as an input, accepts commands from the software developer through a user interface, and performs debugging by checking the operation of the program being debugged.

Figure 3:
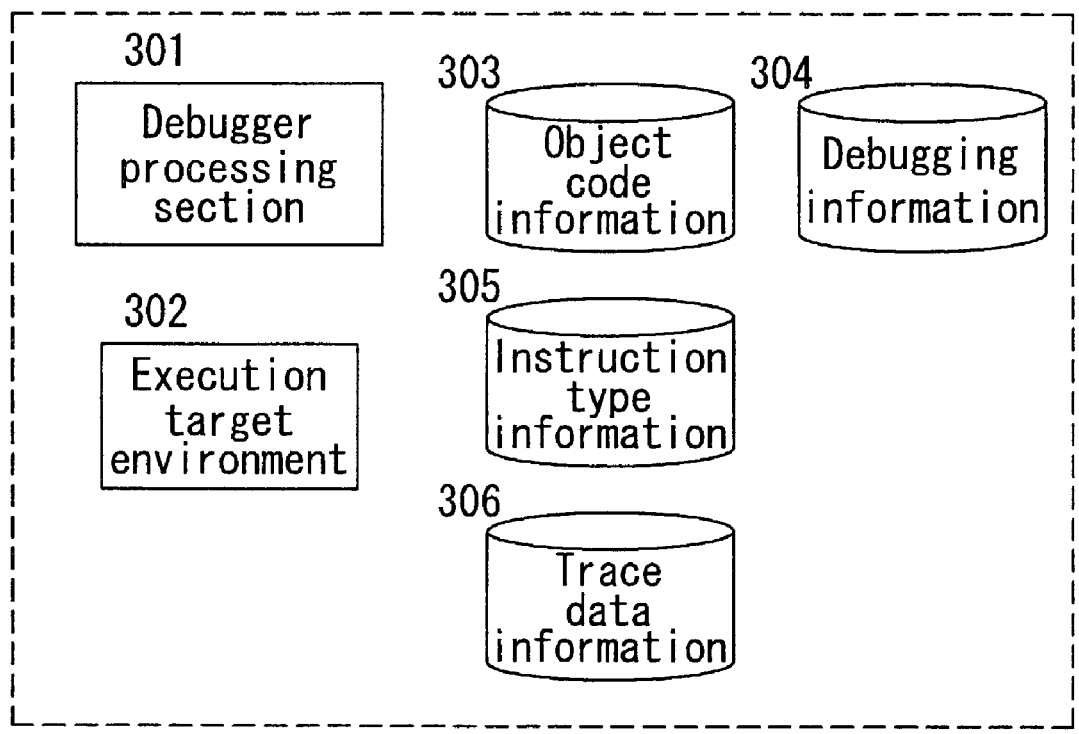
FIG. 3 is a functional block-diagram of a debugger according to the first embodiment of the present invention.

The operation of the debugger 204A of this embodiment will be described below. FIG. 3 shows a functional block diagram of the debugger 204A.

Reference numeral 301 is a debugger processing section, which processes input/output operations, such as an input of a debugger command from the software developer as the user and the display or output of information for presentation to the user, and which performs processing in response to the debugger command thus input.

Reference numeral 302 is an execution target environment on which the program of the object file 203 is executed, and which is, for example, a microcomputer simulator implemented on a computer. Alternatively, the execution target environment may be implemented using an evaluation board on which the target microcomputer or a memory is mounted. The debugger processing section 301 realizes the debugging functions by controlling the execution target environment 302.

Reference numeral 303 is object code information which is the information stored in the debugger 204A by reading therein the object file 203, i.e., the program to be debugged, in accordance with an instruction from the user.

Reference numeral 304 is the debugging information containing various kinds of information necessary for debugging. This information is stored in the object file 203, and is read into the debugger. The contents include, for example, information for associating symbols such as function names and variable names with addresses, line number information for associating addresses with source lines in the C language program, and location information indicating the resource, such as a register or a memory, to which each variable is assigned.

Reference numeral 305 is instruction type information which is the information for associating instruction code with an instruction type, and includes information about mnemonic character strings in assemble form. By referring to this information, disassembling can be achieved from a memory value which is an instruction code on a memory.

FIG. 25 shows an example of the instruction type information 305. The instruction type information shown here comprises instruction format information 3001 for identifying instruction code, mnemonic character string information 3002 holding the corresponding mnemonic character string, number-of-cycles information 3003 indicating the time required to execute an instruction, conditional execution instruction information 3004 indicating whether the instruction is a conditional execution instruction or not, and flag update information 3005 indicating whether the instruction is an instruction that updates a condition flag to be referred to by a conditional execution instruction. These pieces of information are managed according to the corresponding instruction type. Examples are shown at 3006, 3007, and 3008. Shown at 3006 is the instruction type information for an add instruction. The instruction format is expressed in binary form, and register specifying fields are indicated by <R1>, etc. It is also shown that the instruction is not a conditional execution instruction, nor is it a flag update instruction. Likewise, 3007 is the instruction type information for an add instruction as a conditional execution instruction, and 3008 is the instruction type information for a cmp instruction which updates a condition flag.

Reference numeral 306 is trace data information in which trace frame data for outputting a trace is stored.

Figure 4:
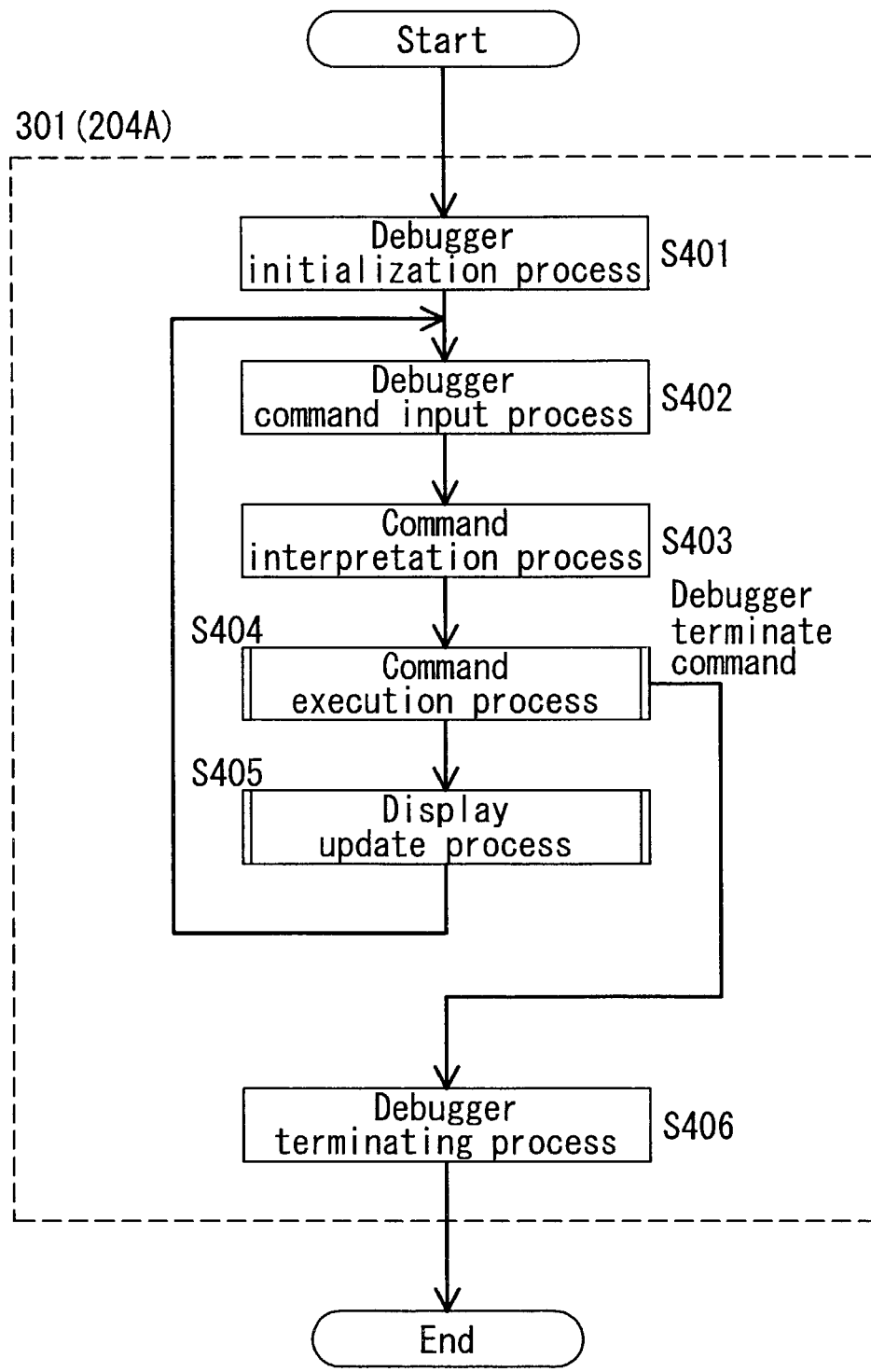
FIG. 4 is a flow diagram of a debug process according to the first embodiment of the present invention.

FIG. 4 shows a process flow for the debugger processing section 301. When the debugger is activated, initialization is performed in step S401 to initialize the working memory of the debugger, draw a display window, etc.

Next, in step S402, a debugger command is accepted from the user. Here, the user enters a command for reading the object code of the program to be debugged or a command necessary for debugging, such as a program execution start command, a breakpoint setup command, or a memory dump command.

Next, in step S403, the entered command is interpreted, and in step S404, processing is performed for the entered command. The method of command execution is well known in the art and will be not described in detail here.

Next, in step S405, the debugger display is updated. The display update process includes, for example, updating the display contents of the code display window so as to display the codes before and after the address at which the program execution is caused to halt, and updating the display contents of the memory window so as to reflect changes in memory contents.

When a terminate command is entered in step S404, the terminating process, such as freeing the debugger working area and cutting the connection to the execution target environment, is performed in step S406.

Figure 1:
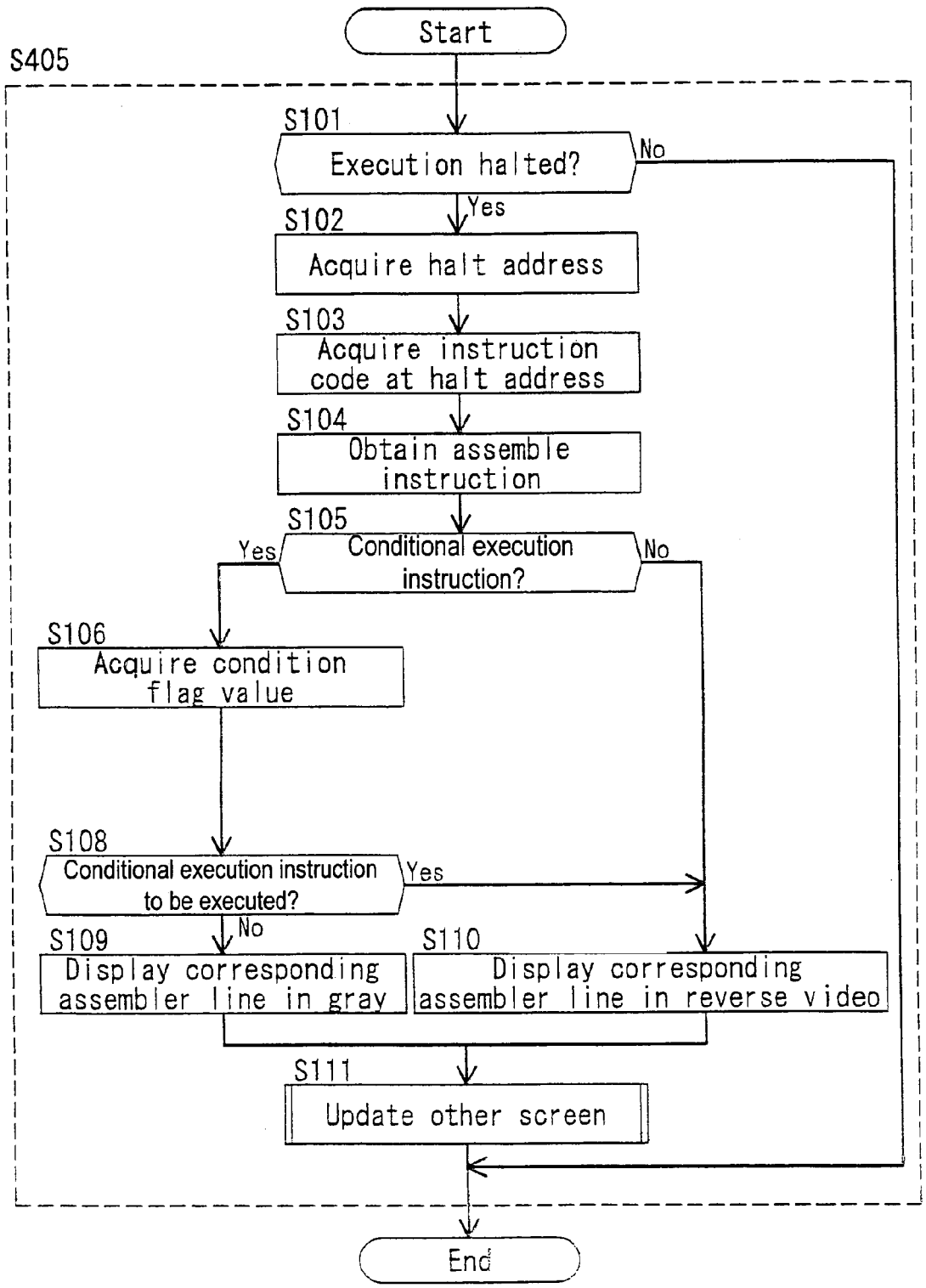
FIG. 1 is a flow diagram of a display update process according to a first embodiment of the present invention.

FIG. 1 shows the process flow of the display update process in step S405.

In step S101, the execution state of the program being debugged is examined on the execution target environment 302, and if the execution is halted, the process proceeds to step S102. If the execution of the program is not halted, but is continuing, the process is terminated since there is no need to update the display. On the other hand, if the execution is halted, the following steps are carried out to produce a display indicating to the program developer at which point in the program being debugged the execution is caused to halt.

In step S102, the halt address of the program being debugged is acquired. That is, the register value of the program counter (PC) of the microcomputer on the execution target environment 302 is acquired.

Next, in step S103, instruction code at the halt address acquired in step S102 is read from the object code information 303 stored in the debugger.

In step S104, the instruction code is disassembled to obtain an assemble line character string corresponding to the instruction code. The disassembling is done by referring to the instruction type information 305 managed in the debugger.

Next, in step S105, by referring to the instruction type information 305 managed in the debugger, based on the instruction code, it is determined whether the instruction is a conditional execution instruction. The determination whether or not the instruction is a conditional execution instruction can be made by referring to the conditional execution instruction information 3004 in the instruction type information. If it is a conditional execution instruction, the process proceeds to step S106. If it is not a conditional execution instruction, the process proceeds to step S110.

In step S106, the type of the condition flag is obtained by referring to the instruction type information 305, and the value of the condition flag is acquired from the execution target environment 302.

In step S108, based on the condition flag value obtained in step S106, it is determined whether the conditional execution instruction is to be executed or not. If the conditional execution instruction is to be executed, the process proceeds to step S110. If the conditional execution instruction is not to be executed, the process proceeds to step S109.

If the conditional execution instruction is not to be executed, in step S109 the operation part not executed is displayed in dim gray color and the condition flag part in reverse video, and the line previously displayed in reverse video is now displayed in normal video.

In step S110, on the other hand, the corresponding assemble line character string is displayed in reverse video on the screen, and the line previously displayed in reverse video is now displayed in normal video.

Finally, in step S111, the display of memory contents, etc., other than the instruction code display, is updated.

Operation will be described below by way of specific example.

Figure 5:
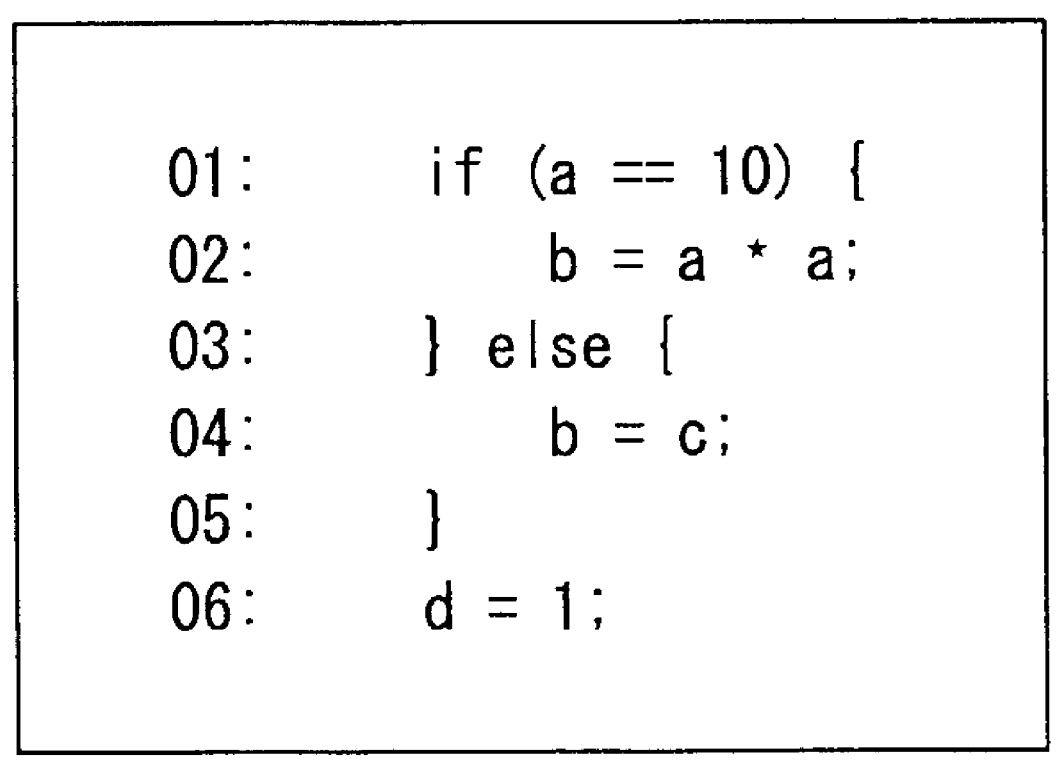

FIG. 5 shows a portion of a C language program to be debugged. Here, "01:", "02:", etc. are line numbers shown for purposes of explanation. In this program, the instruction on line 02 or 04 is executed according to the value of a variable "a" in the conditional statement.

FIG. 6 shows the result of assembling the C language program of FIG. 5 into microcomputer instruction code having a conditional execution instruction. That is, a portion of the result of the program compilation performed by the compiler 202 is shown. Here, "0x400:", "0x404:", etc. indicate the addresses at which instructions are placed. In this example, the if-else condition execution structure in the C language is implemented using a conditional execution instruction.

At address 0x400, the value of register Ra is compared with 10, and the result is placed into flag c0. At address 0x404, if the flag c0 is true, the square of the value of the register Ra is transferred into register Rb. If the flag c0 is false, the instruction does nothing.

At address 0x408, if the flag c0 is false, the contents of register Rc are transferred into the register Rb. If the flag c0 is true, nothing is done. The sequence of instructions from address 0x400 to address 0x408 in FIG. 6 corresponds to the logic structure described by the if-else statement from line 01 to line 05 in FIG. 5.

It is assumed here that the execution of the program being debugged halts at address 0x400 when the value of the register Ra is 10 in the program shown in FIG. 6.

In this case, the assemble line at the halt address 0x400 is displayed in reverse video on the code display screen, as shown in FIG. 7A. This display screen is produced on a display (not shown) connected to the debugger 204A.

The user enters a step execute command in step S402.

In step S403, the entered command is interpreted, and necessary information, such as the information indicating that the type of the command is step execution, is extracted.

In step S404, step execution is performed based on the information extracted in step S403. As a result, one instruction in the program being debugged is executed from the halt address on the execution target environment 302, and then the execution halts.

To update the display in step S405, the process proceeds to step S101.

In step S101, it is determined whether the execution is halted or not. Since the execution is halted, the process proceeds to step S102.

In step S102, the program counter (PC) value of the microcomputer is acquired from the execution target environment 302, to acquire the halt address. In this case, 0x404 is obtained as the halt address.

Next, in step S103, the instruction code at the halt address 0x404 is read from the object code information 303, and in step S104, the instruction code is disassembled by referring to the instruction type information 305, to obtain an assemble line "(c0) mul Ra, Ra, Rb" as the resulting character string.

In step S105, it is determined that the instruction is a conditional execution instruction, and the process proceeds to step S106.

In step S106, the value of the condition flag c0 for the instruction is acquired. In this case, "1" is obtained as the value of c0.

In step S108, since the value of the condition flag c0 is "1", it is determined that the conditional execution instruction is to be executed, and the process proceeds to step S110.

In step S110, the assemble line "(c0) mul Ra, Ra, Rb" is displayed in reverse video. An example of the resulting display is shown in FIG. 7B.

When the user enters the step execute command again, the process proceeds through steps S101, S102, S103, S104, S105, S106, and S108 in the same manner as described above.

In step S108, since condition flag !c0 is "0", it is determined that the conditional execution instruction is not to be executed, and the process proceeds to step S109.

In step S109, the operation part not executed, "mov Rc, Rb", is displayed in dim gray color and the condition flag part "(!c0)" in reverse video, and the line previously displayed in reverse video is now displayed in normal video. An example of the resulting display is shown in FIG. 7C. In FIG. 7C, "mov Rc, Rb" is shown as being enclosed within a rectangular box for convenience of illustration, but actually, it is displayed in dim gray color, not within a box.

When the step execute command is entered once again, the resulting display is as shown in FIG. 7D.

In the thus configured debugger, when the user tracks the execution of the program step by step by entering the step execute command, since any conditional execution instruction not executed is displayed in a different display form, the conditional execution instruction can be presented in an easy-to-view form, and the user can thus debug the program while viewing the executing process of the program being debugged.

In the present embodiment, when the conditional execution instruction is not to be executed, in step S109 the operation part not executed is displayed in dim gray color, but the method of display is not limited to this particular example; alternatively, strikeout lines may be written over the unexecuted part, or the unexecuted part may be displayed in smaller fonts or overwritten with a character string "Not Executed".

Furthermore, in the present embodiment, when the conditional execution instruction is not to be executed, in step S109 the halt address part "0x408:" and the condition flag part "(!c0)" are displayed in reverse video, while displaying the operation part not executed in dim gray color; alternatively, only the halt address part "0x408:" may be displayed in reverse video, and the condition flag part and the operation part not executed may be displayed in dim gray color, or may be displayed as strikeout text or in smaller fonts or may be overwritten with a character string "Not Executed".

Embodiment 2

Figure 8:
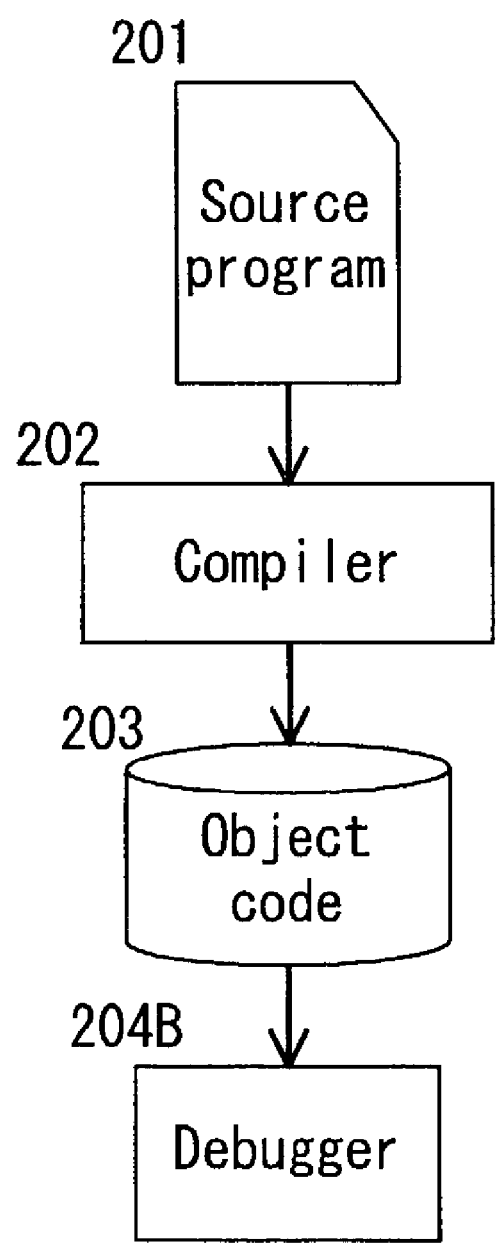
FIG. 8 is a diagram showing the configuration of a software development support system according to a second embodiment of the present invention.
Figure 9:
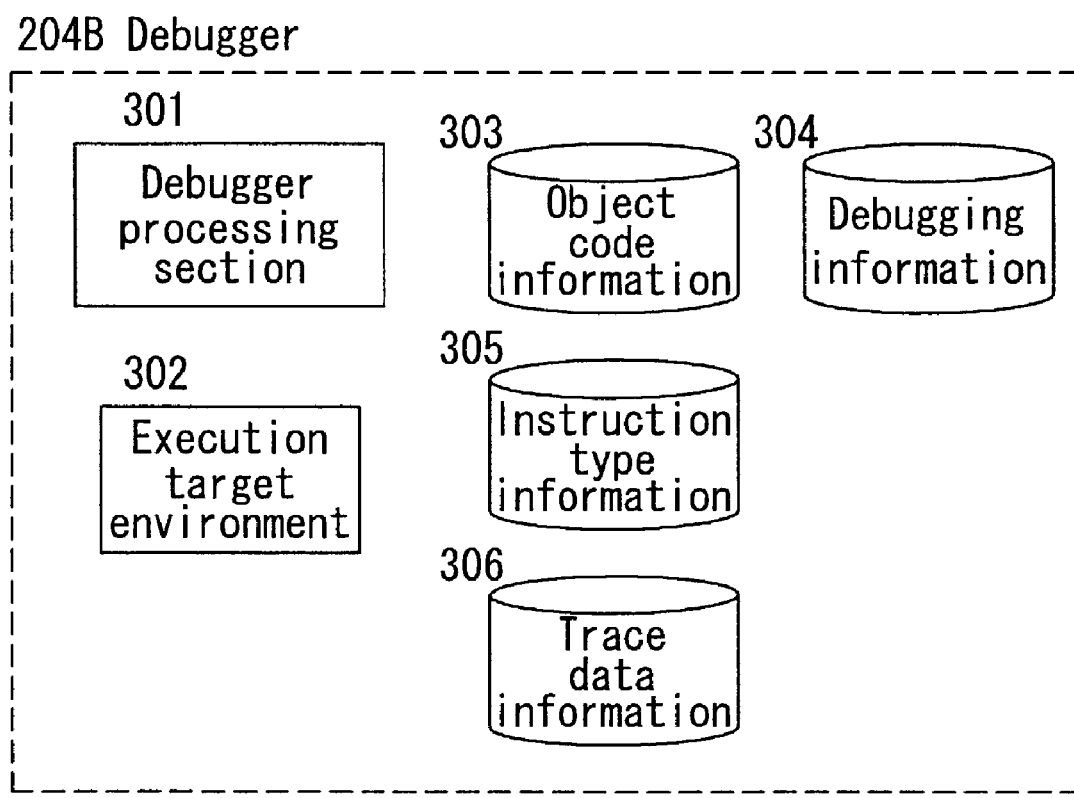
FIG. 9 is a functional block diagram of a debugger according to the second embodiment of the present invention.

Next, a second embodiment of the present invention will be described. FIG. 8 is a diagram showing the configuration of a software development support system according to the second embodiment, and FIG. 9 is a functional block diagram of a debugger 204B; as can be seen, the configuration is substantially the same as that of the first embodiment. The second embodiment differs from the first embodiment in the process performed in the debugger 204B, and more specifically, in the trace data output process performed in the execution target environment 302 and the trace data output processing process in step S404.

In the second embodiment of the present invention, it is assumed that the execution target environment 302 is implemented as a software simulator of the target microcomputer.

Figure 10:
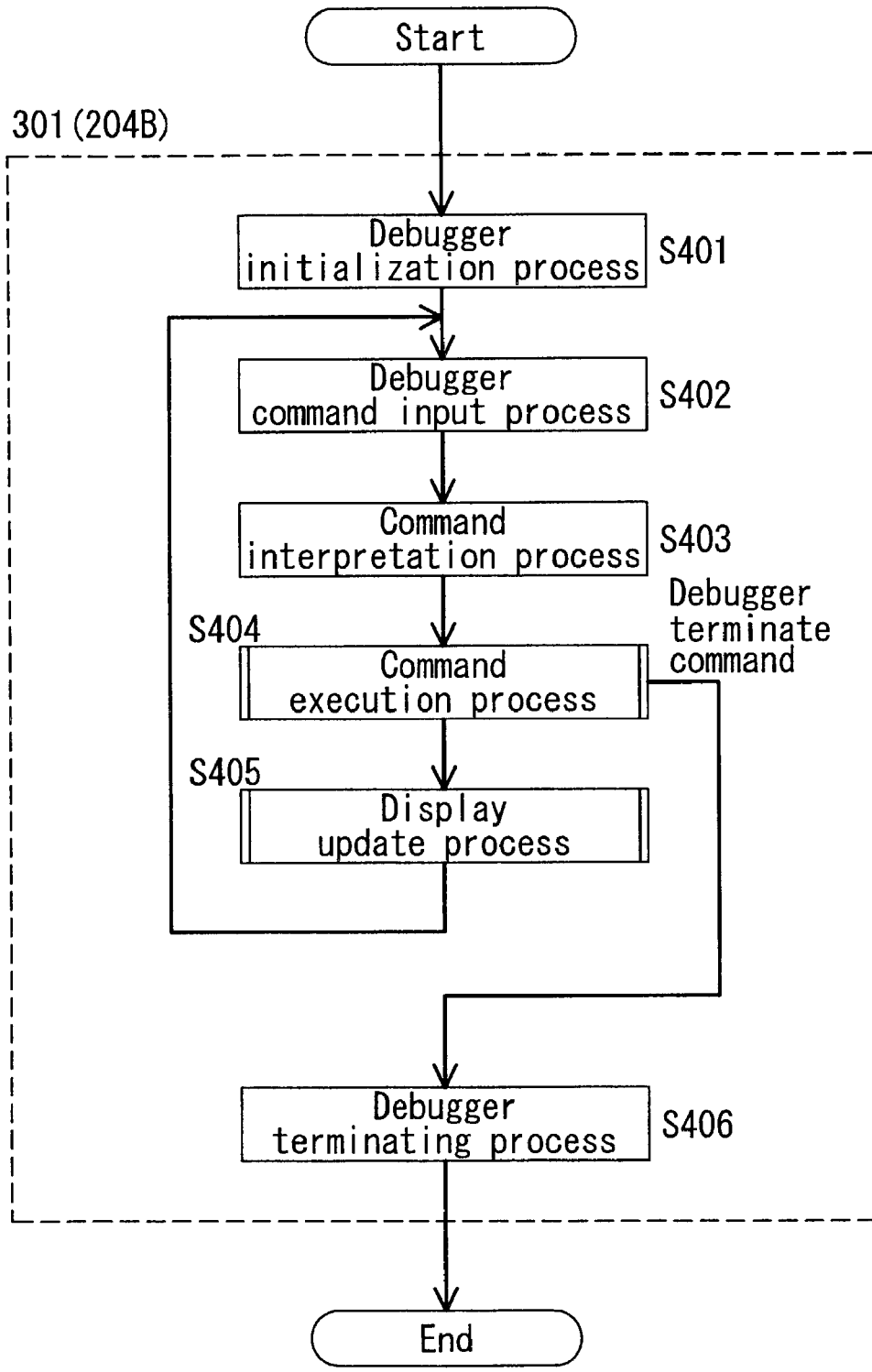
FIG. 10 is a flow diagram of a debug process according to the second embodiment of the present invention.

FIG. 10 is a process flow diagram of the debugger processing section 301, the process flow being the same as that of the first embodiment of the present invention.

When a program execute command is input to the debugger 204B, the program is executed in step S404. The program execution process is initiated by instructing the execution target environment 302 to execute the program. In the present embodiment, the execution target environment 302 is implemented as a software simulator, and execution of a program is accomplished by performing instruction simulation.

Figure 11:
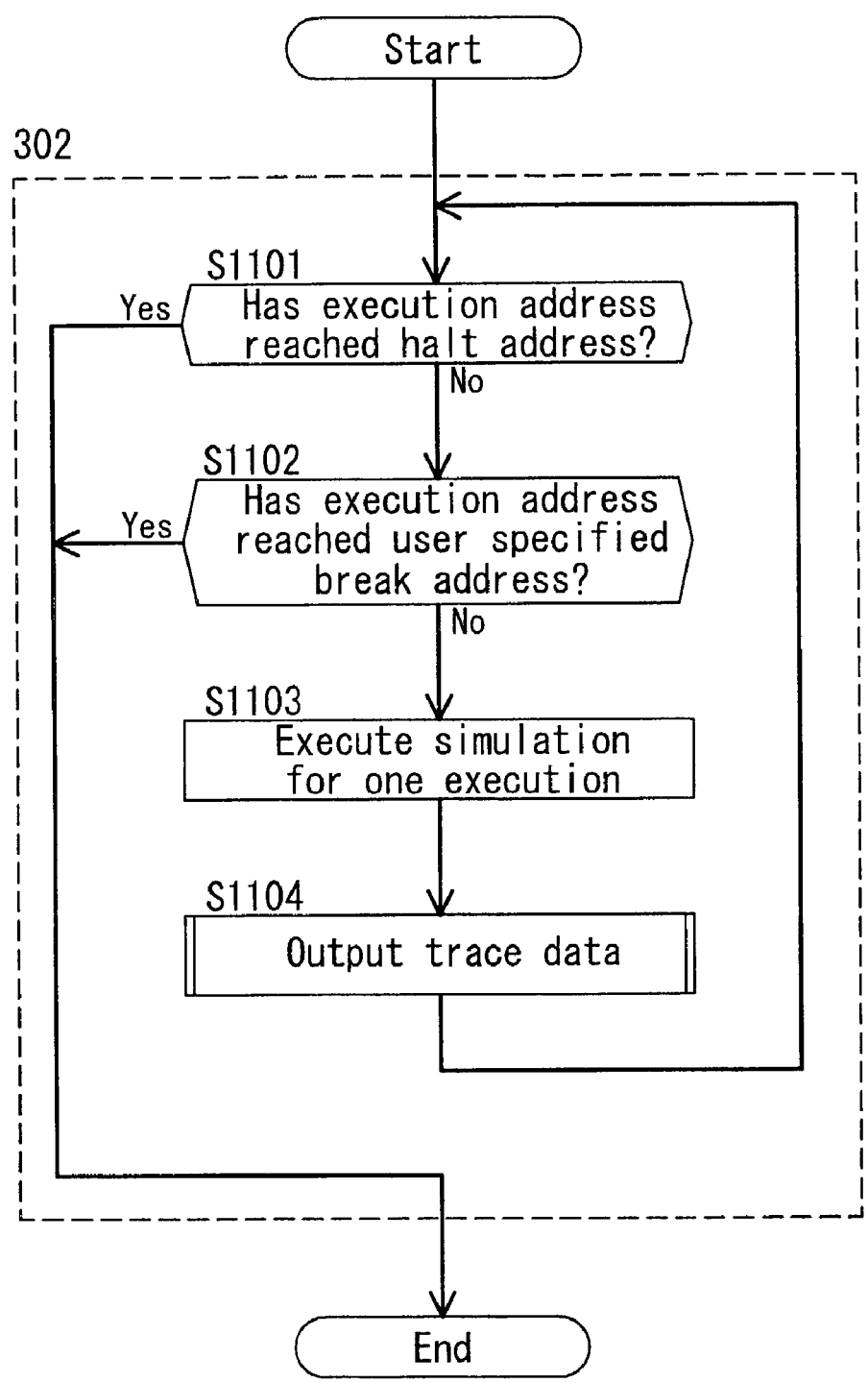
FIG. 11 is a process flow diagram of a simulator according to the second embodiment of the present invention.

FIG. 11 shows a process flow illustrating the instruction simulation process in the execution target environment 302 implemented as a software simulator.

In FIG. 11, the value of the program counter register (PC) in the simulator is read out in step S1101, to determine whether the execution address has reached the predetermined halt address (for example, an exit function). If the halt address is reached, the process is terminated; otherwise, the process proceeds to step S1102.

In step S1102, user specified break address information is read from a debug operation processing section, to determine whether the execution address has reached the break address. If the break address is reached, the process is terminated; otherwise, the process proceeds to step S1103. Usually, the user enters a break address set command in step S402 to specify the desired break (interrupt) address before initiating the execution of the program to be debugged. The debug operation processing section is contained in the debugger processing section 301, and the result of the interpretation in step S403 of the debugger command entered by the user in step S402 and the break address information can be obtained from it.

In step S1103, simulation for one instruction is performed.

Figure 12:
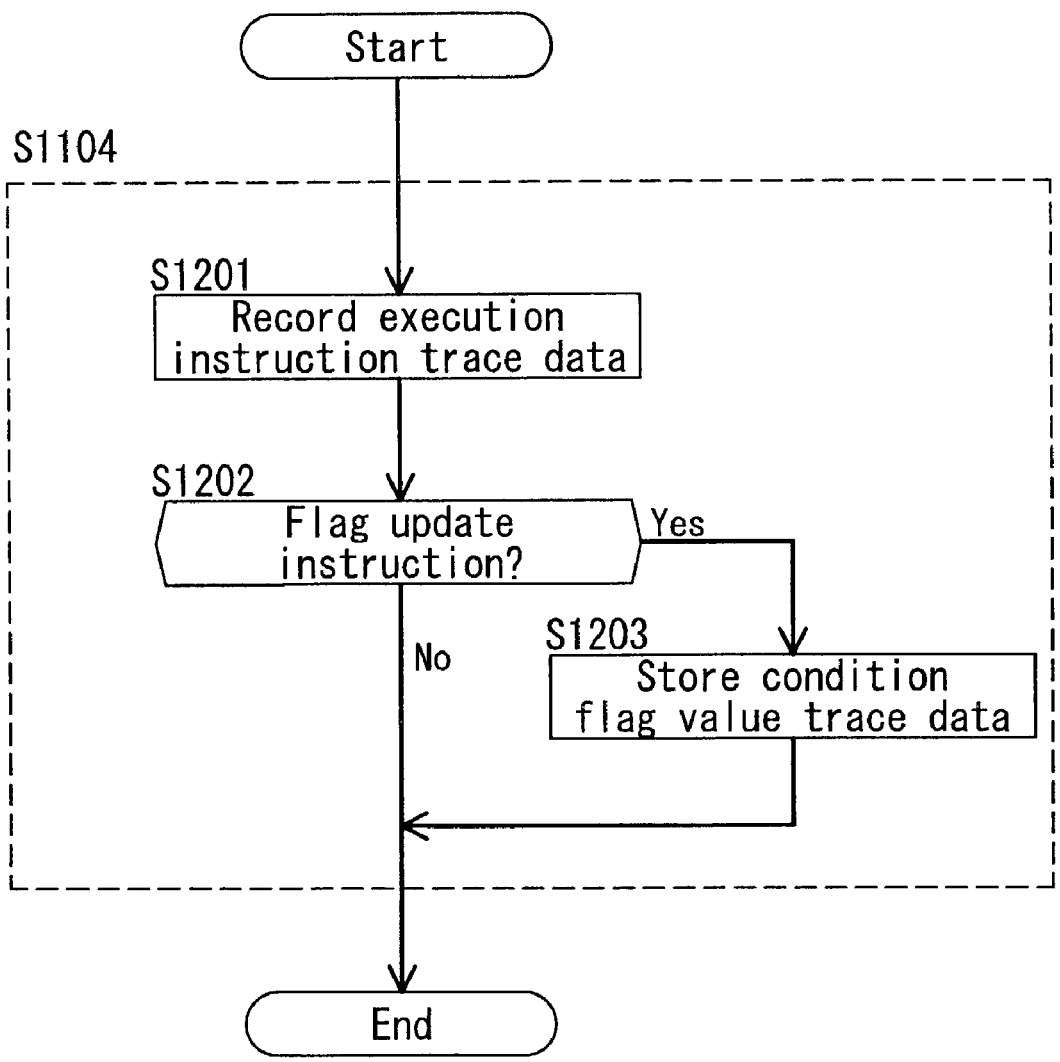
FIG. 12 is a process flow diagram of a trace data generation process in the simulator according to the second embodiment of the present invention.

In step S1104, trace data recording the execution of that one instruction is output. FIG. 12 shows the process flow of the trace data output process in step S1104.

Trace results are stored for each instruction as trace data in the trace data information 306 in the debugger. The structure of the trace data is shown in FIG. 13A. Reference numeral 1301 is a frame number field in which the number of the information output as a trace is recorded; 1302 is a time field in which the trace output time is recorded; 1303 is a data type field in which the type of the trace data is recorded; 1304 is an address field in which an address relating to the trace data is recorded or, in the case of trace data recording an execution instruction, the address of that instruction is recorded; 1305 is an instruction field in which the executed instruction is recorded; and 1306 is a data field in which data relating to the trace data is recorded or, in the case of trace data recording a conditional execution flag value, the flag value is recorded.

The trace data output process in step S1104 for outputting trace data recording the execution of one instruction will be described below with reference to FIG. 12.

In step S1201, the frame data of the execution instruction is recorded. That is, frame number and time are recorded, execution instruction is recorded as the trace data type, and execution address and instruction assemble line are recorded. After that, the frame number is incremented by 1. The time is recorded by acquiring the number of execution cycles managed by the simulator. The assemble line is obtained by referring to the instruction type information 305.

In step S1202, the type of the current instruction is identified by referring to the instruction type information 305. If it is a flag update instruction, the process proceeds to step S1203; otherwise, the process is terminated.

In step S1203, the value of the condition flag is recorded as new trace data. That is, frame number and time are recorded, condition flag type is recorded as the trace data type, and execution address and condition flag value are recorded. After that, the frame number is incremented by 1. The value of the condition flag is acquired from the simulator of the execution target environment 302.

A detailed description will be given below for the case where the instructions from address 0x400 to 0x40c in the program shown in FIG. 6 are executed. It is assumed that the initial program counter (PC) value points to 0x400, and that the value of the register Ra is 10. It is also assumed that address 0x410 is set as the halt address, but no break address is set.

The user enters a step execute command in step S402. In step S403, the entered command is interpreted, and in step S404, processing is performed to execute the program. In step S404, the execution target environment 302 as a software simulator is controlled to perform instruction execution simulations. In the software simulator, it is determined in step S1101 whether the execution address 0x400 coincides with the halt address 0x410. Since the halt address is not reached as yet, the process proceeds to step S1102. In step S1102, break address is checked, but since no break address is set, the process proceeds to step S1103. In step S1103, simulation of the cmp instruction at address 0x400 is performed. In step S1104, the process proceeds to step S1201 for trace data output. In step S1201, trace data for the cmp instruction is recorded in the trance data information 306. The thus recorded trace data information is shown at 1307 in FIG. 13B. Next, in step S1202, it is determined whether the instruction is a flag update instruction. Since the cmp instruction is an instruction that updates the flag c0, the process proceeds to step S1203. In step S1203, condition flag value trace data is recorded. The trace data information thus recorded is shown at 1308 in FIG. 13B. In like manner, instruction simulations are performed on addresses 0x404, 0x408, and 0x40c in this order, recording the trace data shown at 1309, 1310, and 1311, respectively, in FIG. 13B.

The program execution process in step S404 is thus completed, and in the next step S405, display contents are updated by performing processing such as displaying the codes before and after the halt address. After that, the process waits for an input of the next command (step S402).

Next, a description will be given for the case where the trace data stored in the trace data information 306 is output in response to a request from the user.

Figure 14:
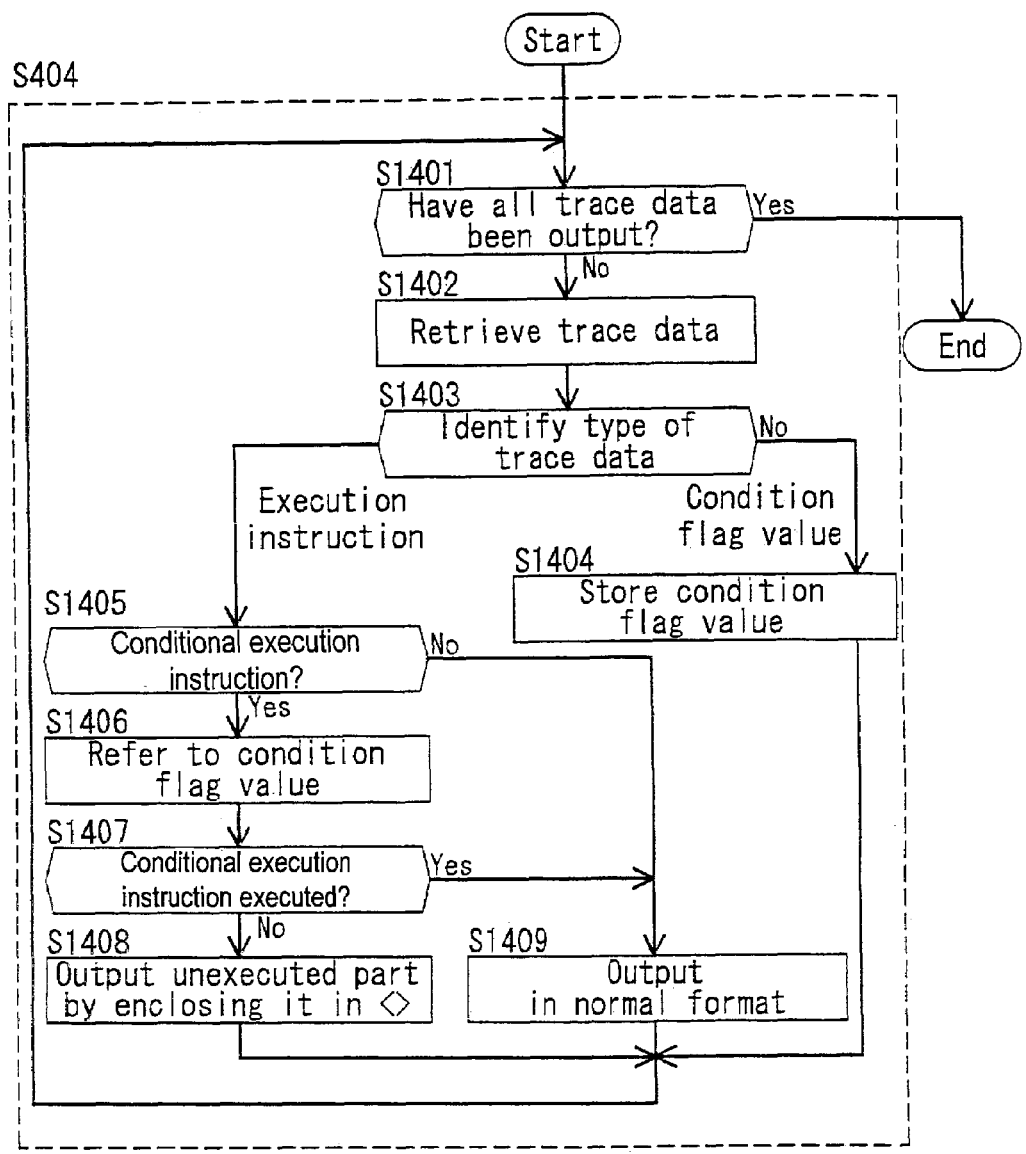
FIG. 14 is a process flow diagram of a trace output process according to the second embodiment of the present invention.

FIG. 14 shows a process flow illustrating the trace data output process performed in step S404 when a trace data output command is entered by the user.

The trace data output is performed after the execution of the program, allowing the user to check the executing process of the program being debugged.

In step S1405, the instruction field is read from the trace data, to determine whether the traced instruction is a conditional execution instruction or not. If it is a conditional instruction, the process proceeds to step S1406; otherwise, the process proceeds to step S1409.

In step S1402, one set of trace data is retrieved from the trace data information 306.

In step S1403, the type of the trace data is identified. In the case of condition flag value trace data, the process proceeds to step S1404, while in the case of execution instruction trace data, the process proceeds to step S1405.

In step S1404, the type and value of the condition flag are read from the trace data, and stored in memory.

In step S1405, the instruction field is read from the trace data, to determine whether the traced instruction is a conditional instruction or not. If it is a conditional instruction, the process proceeds to step S1406; otherwise, the process proceeds to step S1409.

In the case of a conditional execution instruction, the flag value stored in step S1404 is referred to in step S1406.

In step S1407, it is determined based on the condition flag value whether the conditional execution instruction has been executed or not. If it has been executed, the process proceeds to step S1409. If it has not been executed, the process proceeds to step S1408.

In step S1408, the instruction is output by enclosing the unexecuted operation part in "<>", and the process returns to step 1401.

In step S1409, the executed instruction is output, and the process returns to step S1401, to repeat the output process until all the trace data have been output.

The trace data output process in step S404 is thus completed, and the operation proceeds to the display update process in step S405. In this case, display contents are not updated since the halt address or memory contents have not been changed.

Next, a detailed description will be given below for the case where the instructions from address 0x400 to 0x40c in the program shown in FIG. 6 are executed. It is assumed that the value of the register Ra is 10. In this case, the trace data shown at 1307, 1308, 1309, 1310, and 1311 in FIG. 13B are stored in the trace data information 306.

Figure 15:
FIG. 15 is a diagram showing an output example of trace data.

FIG. 15 shows an output example of trace data when the sequence of instructions shown in FIG. 6 is executed.

The user enters a trace data output command in step S402. In step S403, the entered command is interpreted, and in step S404, the process proceeds to step S1401 to perform processing for trace data output. In step S1401, it is determined whether all the trace data stored in the trace data information 306 have been output. Since all the trace data have not been output yet, the process proceeds to step S1402. In step S1402, one set of trace data is retrieved to obtain the trace data shown at 1307. In step S1403, the type of the trace data is identified; since the type shown at 1307 is execution instruction, the process proceeds to step S1405. In step S1405, it is determined whether the instruction is a conditional execution instruction. Since the instruction recorded in 1307 is not a conditional execution instruction, the process proceeds to step S1409. In step S1409, "0x400: cmp Ra==10, c0" is output in normal format.

In like manner, the data are output sequentially; for the instruction at address 0x408, which is a conditional execution instruction not executed, the operation part not executed is output as "<mov Rc, Rb>".

When the process shown in FIG. 14 has been performed on all the trace data shown in FIG. 13B, as described above, the data shown in FIG. 15 is output as a result of the process. FIG. 15 shows the contents of a trace data file output in response to the trace data output command, but the data need not necessarily be output as a file but may be output for display on the screen.

In the thus configured debugger, when the user checks the executing process of the program by using an instruction trace output, since any conditional execution instruction not executed is displayed in a different display form, the conditional execution logic implemented by a conditional execution instruction can be presented in an easy-to-view form, and the user can thus debug the program while viewing the executing process of the program being debugged.

In the present embodiment, when the conditional execution instruction is not executed, in step S1408 the operation part not executed is output by enclosing it in "<>", but the method of display is not limited to this particular example; alternatively, strikeout lines may be written over the unexecuted part, or the unexecuted part may be displayed in smaller fonts or overwritten with a character string "Not Executed".

In the present embodiment, the execution target environment 302 has been described as being implemented using a software simulator, but it may be implemented using an evaluation board, with provisions made to perform the trace output process in step S1104 in a trace output section implemented in hardware.

Embodiment 3

Next, a third embodiment of the present invention will be described.

FIG. 16 is a diagram showing the configuration of a software development support system according to the third embodiment; as can be seen, the configuration is substantially the same as that of the first embodiment. The difference from the first embodiment lies in the processing performed in the compiler 202C and debugger 204C.

Figure 17:
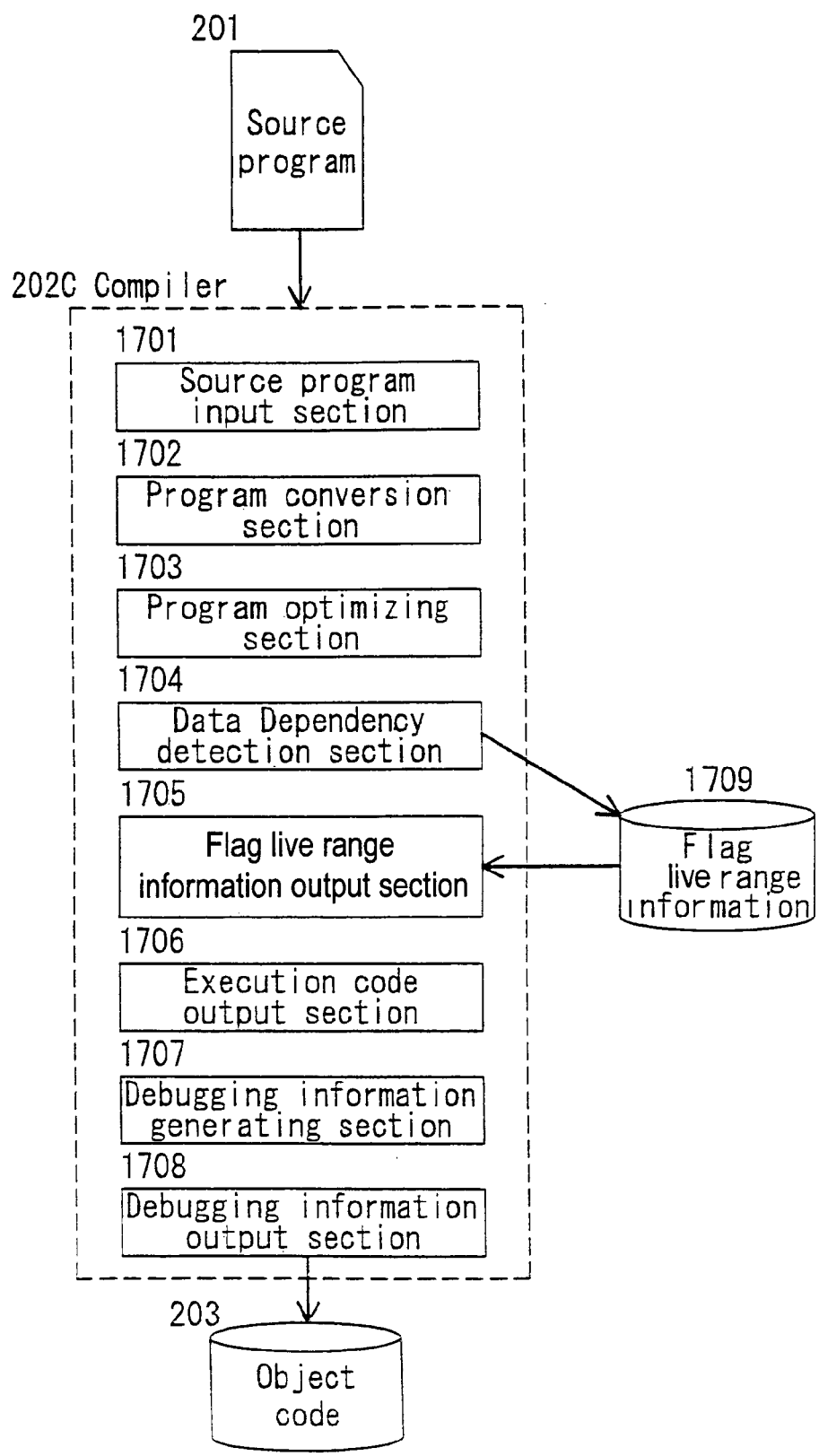
FIG. 17 is a functional block diagram of a compiler according to the third embodiment of the present invention.

FIG. 17 shows a functional block diagram of the compiler 202C according to this embodiment. In FIG. 17, reference numeral 1701 is a source program input section to which the source program is input.

Reference numeral 1702 is a program conversion section which converts the source program into an intermediate description level expression.

Reference numeral 1703 is a program optimizing section, which generates executable code by optimizing the program, for example, by rearranging the execution order of the operations in the intermediate description level program, and deleting unnecessary operations.

Reference numeral 1704 is a data dependency detection section which, based on data chain information obtained by data analysis in the program optimizing section 1703, obtains the live range of a condition flag in the target microcomputer, and stores it in flag live range information 1709.

Reference numeral 1705 is a flag live range information output section which outputs the flag live range information 1709 by adding it to the object code 203.

Reference numeral 1706 is an executable code output section which outputs the executable code, generated by the program optimizing section 1703, as the object code 203.

Reference numeral 1707 is a debugging information generating section which generates debugging information, such as information defining associations between identifies, line numbers, and executable code, necessary for debugging.

Reference numeral 1708 is a debugging information output section which outputs the debugging information, generated by the debugging information generating section 1707, as debugging information by adding it to the object file 203.

Figure 18:
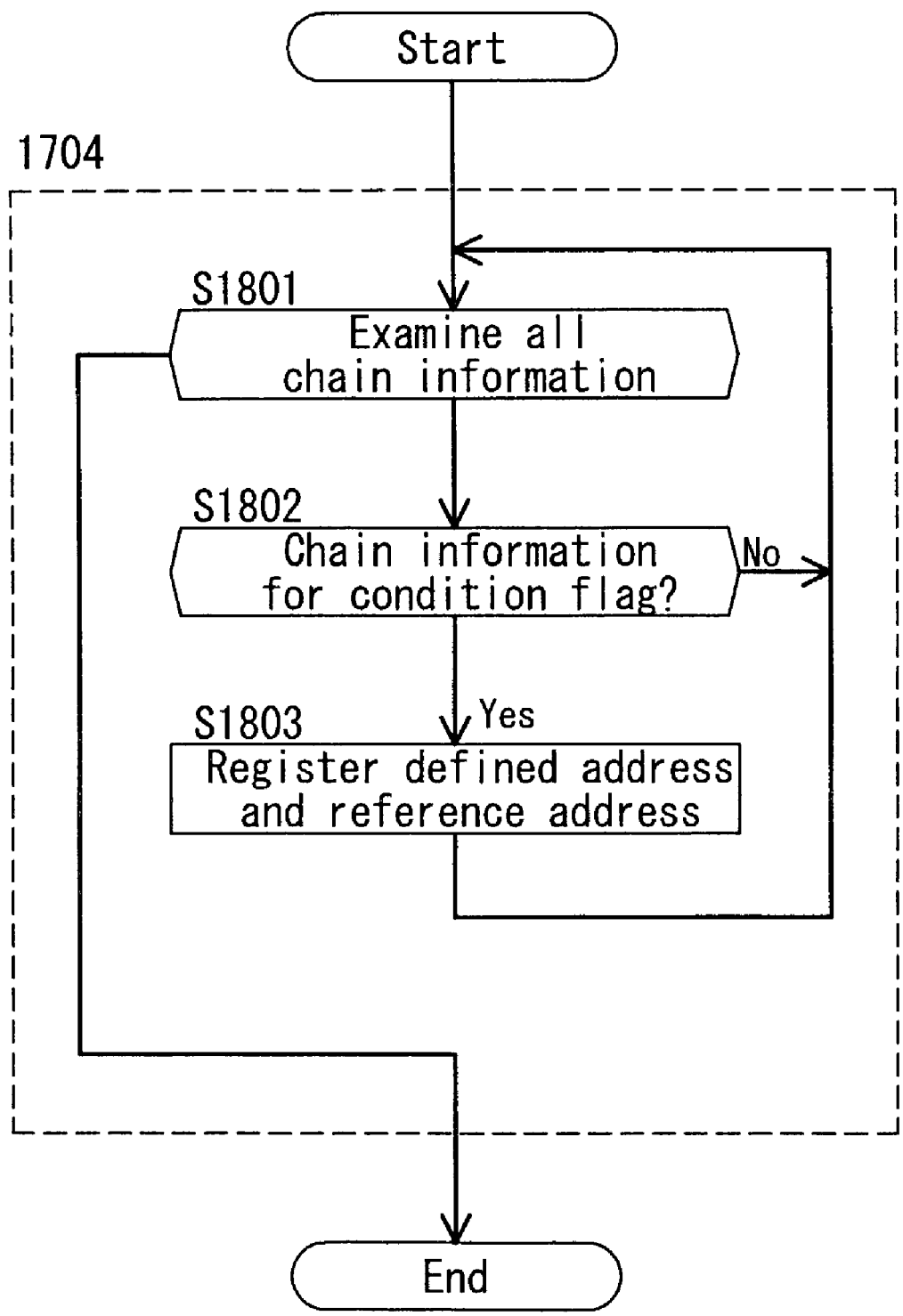
FIG. 18 is a process flow diagram of a flag live range information output section according to the third embodiment of the present invention.

FIG. 18 shows a process flow of the data dependency detection section 1704. In step S1801, data use defining chain information is acquired from the program optimizing section 1703, and the processing in steps S1802 and S1803 is repeated until all the use defining chain information is processed.

In step S1802, it is determined whether the use defining chain information is one that concerns a condition flag. If this condition is satisfied, the process proceeds to step S1803; otherwise, the process proceeds to step S1801.

In step S1803, the defined address and reference address of the condition flag are stored as the live range in the flag live range information 1709 together with the type of the condition flag.

FIG. 19 shows one example of the data use defining chain information. Reference numeral 1901 designates the data use defining chain information number. Reference numeral 1902 indicates the corresponding instruction code. Reference numeral 1903 is a UD list which points to any instruction code that defines the resource used by that corresponding instruction; the elements in the list are the data use defining chain information numbers. The list is provided for each resource, i.e., each of the registers Ra, Rb, Rc, Rd, c0, and c1. Reference numeral 1904 is a DU list which points to any instruction code that uses the resource defined by that corresponding instruction; the elements in the list are the data use defining chain information numbers. The list is provided for each resource, i.e., each of the registers Ra, Rb, Rc, Rd, c0, and c1.

For example, the data use defining chain information number 2 concerns the instruction code "cmp Ra==10, c0"; it is shown here that the instruction that defines the resource Ra used by that instruction code is the instruction code shown at the data use defining chain information number 1, and also that the instruction codes shown at the data use defining chain information numbers 3 and 4 use the resource c0 defined by that instruction code. The data use defining chain information is generated by the program optimizing section 1703, and is used to examine dependencies among data.

Figure 20A:
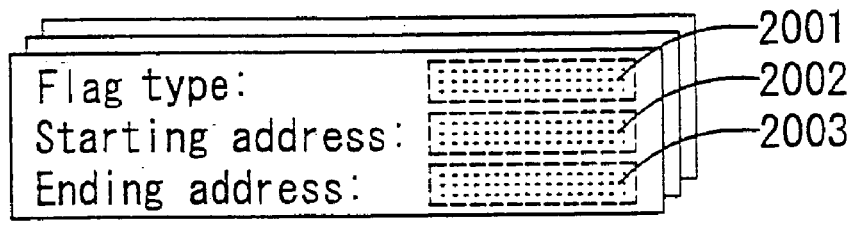
FIG. 20A is a diagram for explaining flag live range information according to the third embodiment of the present invention.

FIG. 20A shows the flag live range information. The live range of a flag refers to the interval from the time that the flag is defined by a flag update instruction to the time that the flag is referred to by an instruction such as a conditional execution instruction or a flag value transfer instruction; during that interval, the flag value remains the same. Reference numeral 2001 indicates a flag type field. Reference numeral 2002 indicates a starting address field, and 2003 an ending address field, which together define the live range of the flag.

Figure 20B:
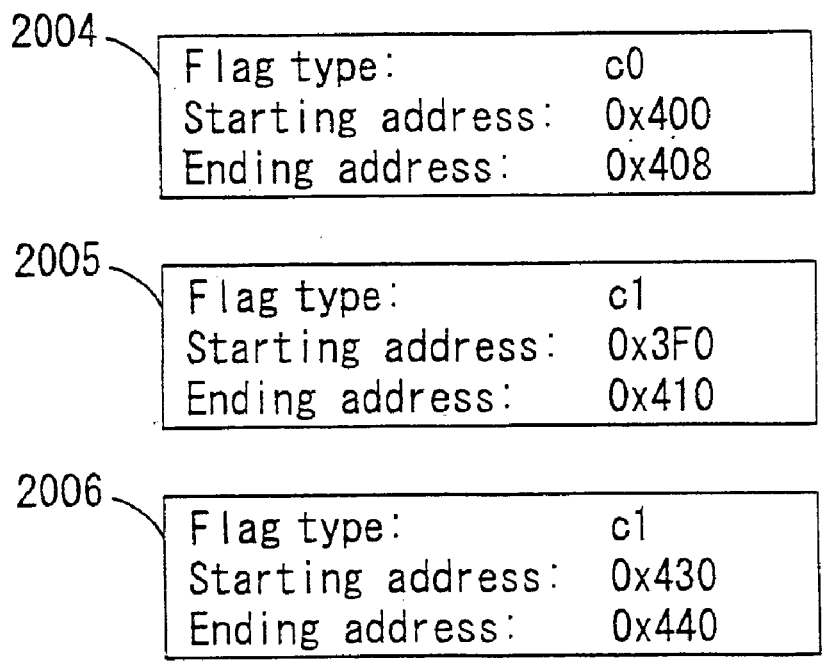
FIG. 20B is a diagram showing examples of the flag live range information according to the third embodiment of the present invention.

FIG. 20B shows examples of the flag live range information. The examples are shown at 2004, 2005, and 2006. The example of 2004, for instance, shows that the flag c0 is defined at address 0x400 and is referred to when the address is between 0x400 and 0x408.

Figure 21:
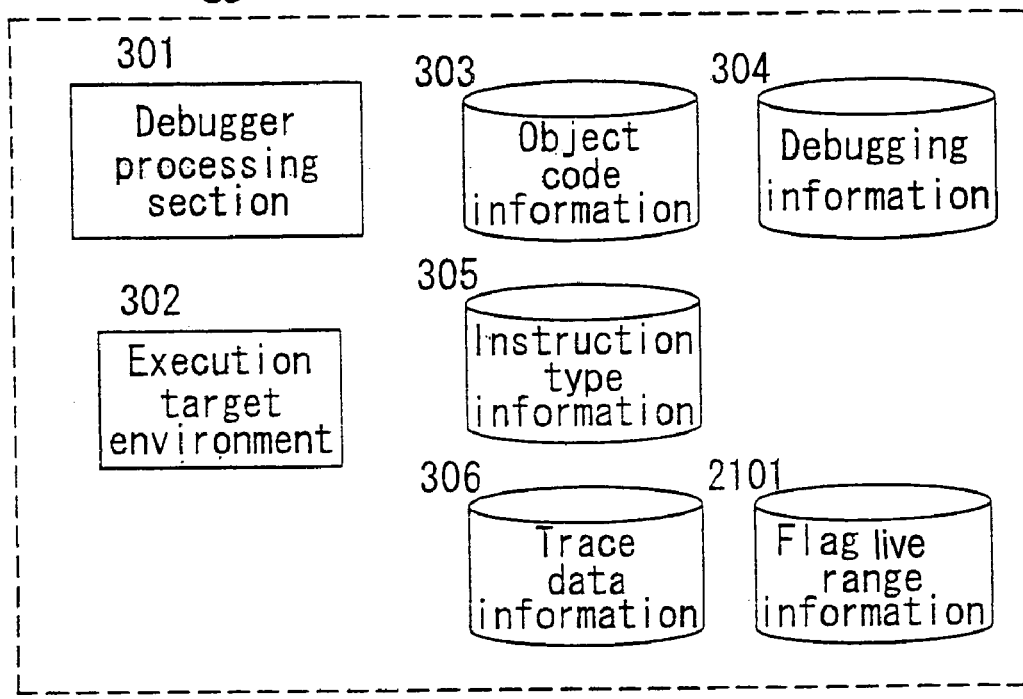
FIG. 21 is a functional block diagram of a debugger according to the third embodiment of the present invention.

FIG. 21 is a functional block diagram of the debugger 204C; as in the first embodiment, reference numerals 301, 302, 303, 304, 305 and 306 indicate the debugger processing section, the execution target environment, the object code information, the debugging information, the instruction type information, and the trace data information, respectively. Further, reference numeral 2101 designates the flag live range information which indicates the address range in which the condition flag is viable. The flag live range information 2101 is read into the debugger by being included in the debugging information generated by the compiler 202C.

Figure 22:
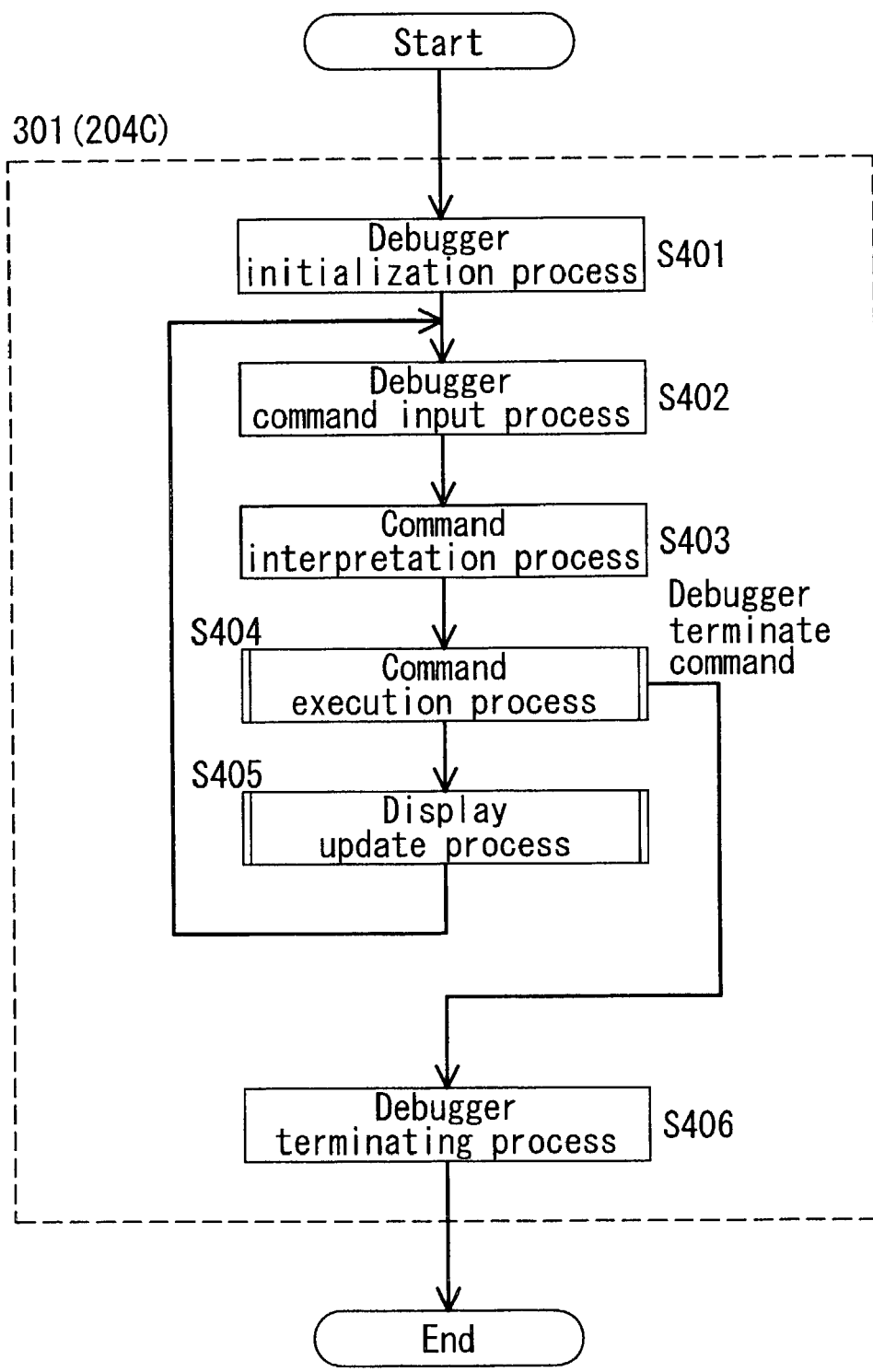
FIG. 22 is a flow diagram of a debug process according to the third embodiment of the present invention.

FIG. 22 is a process flow diagram of the debugger processing section 301, the process flow being the same as that of the first embodiment of the present invention.

Figure 23:
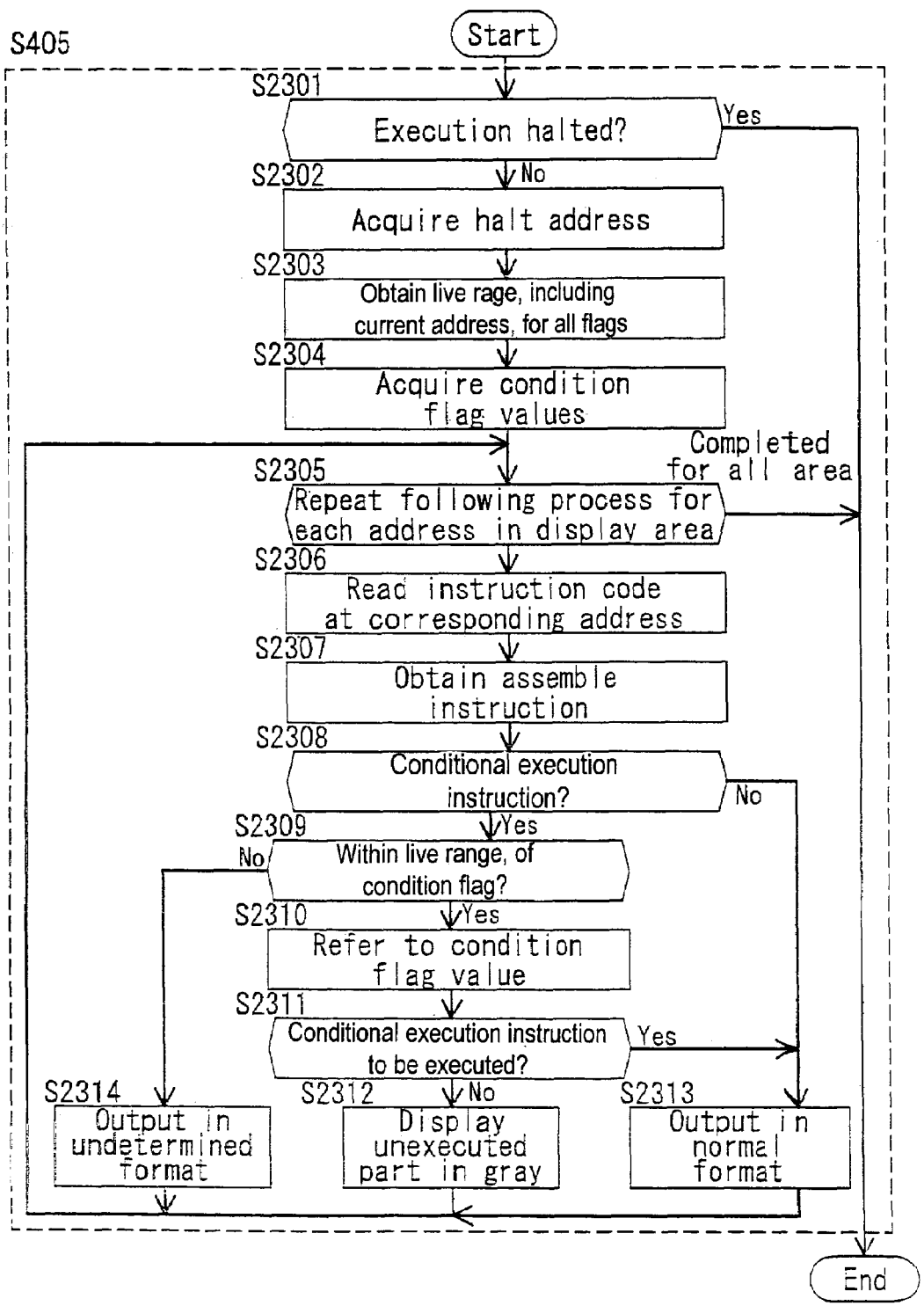
FIG. 23 is a flow diagram of a display update process according to the third embodiment of the present invention.
Figure 26:
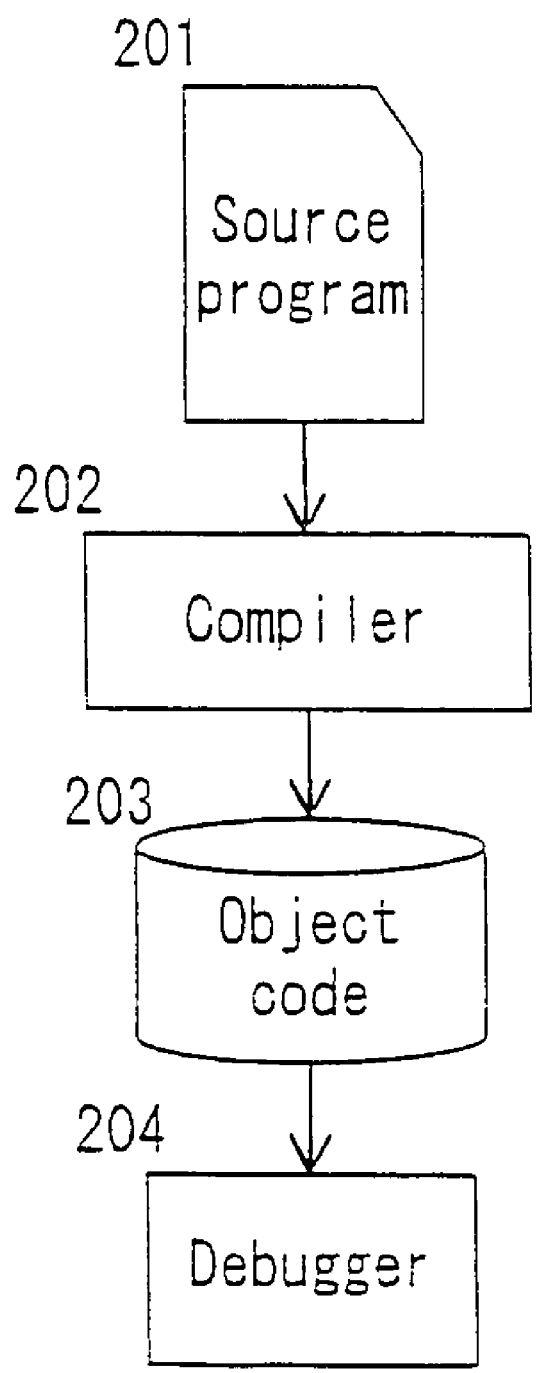
FIG. 26 is a diagram showing the configuration of a software development support system according to the prior art.
Figure 27:
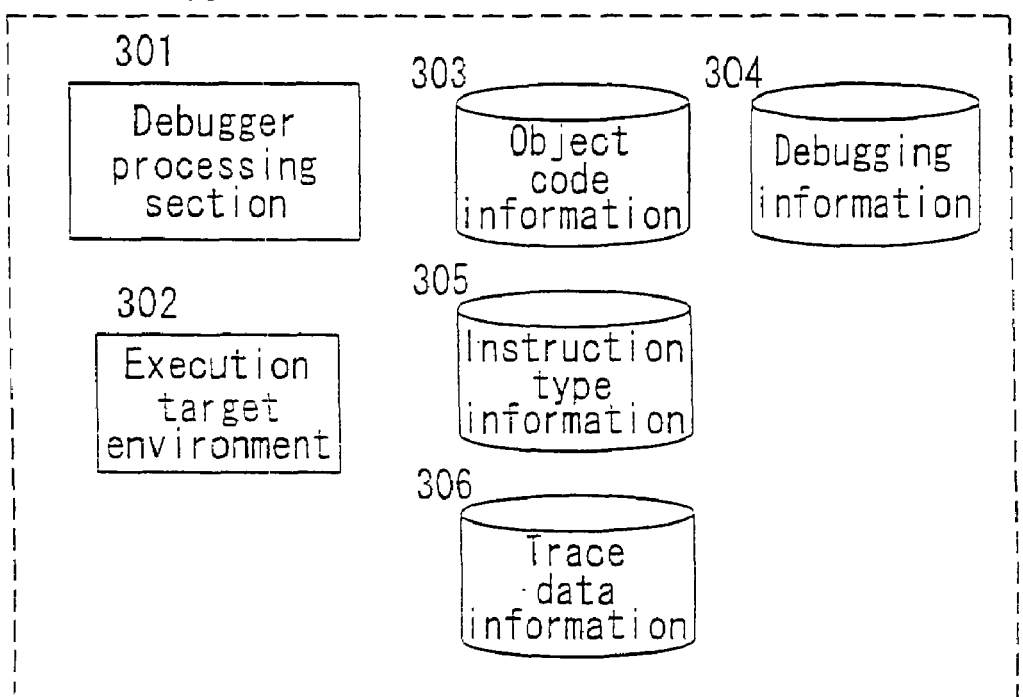
FIG. 27 is a functional block diagram of a debugger according to the prior art.
Figure 28:
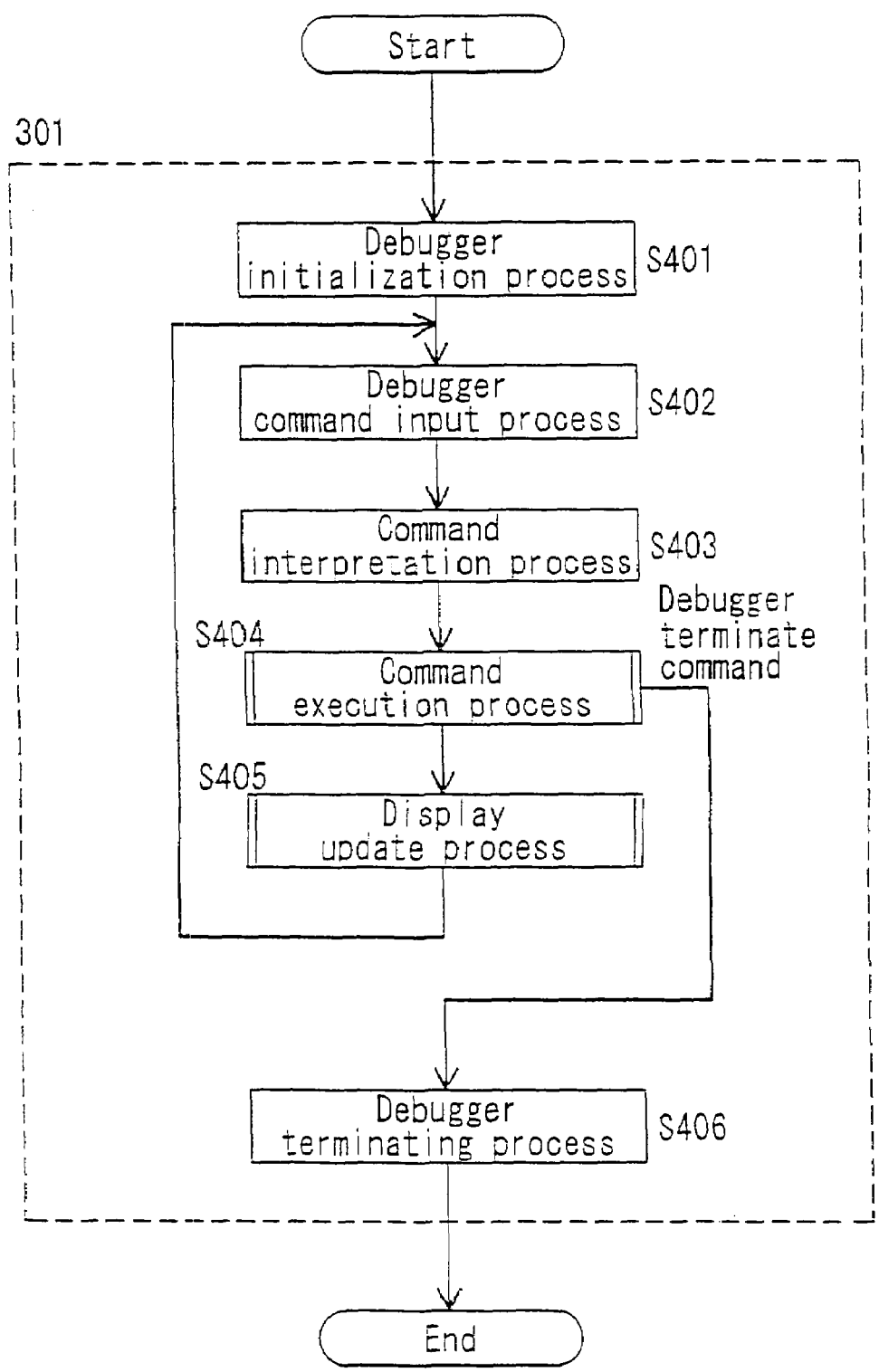
FIG. 28 is a flow diagram of a debug process according to the prior art.
Figure 29:
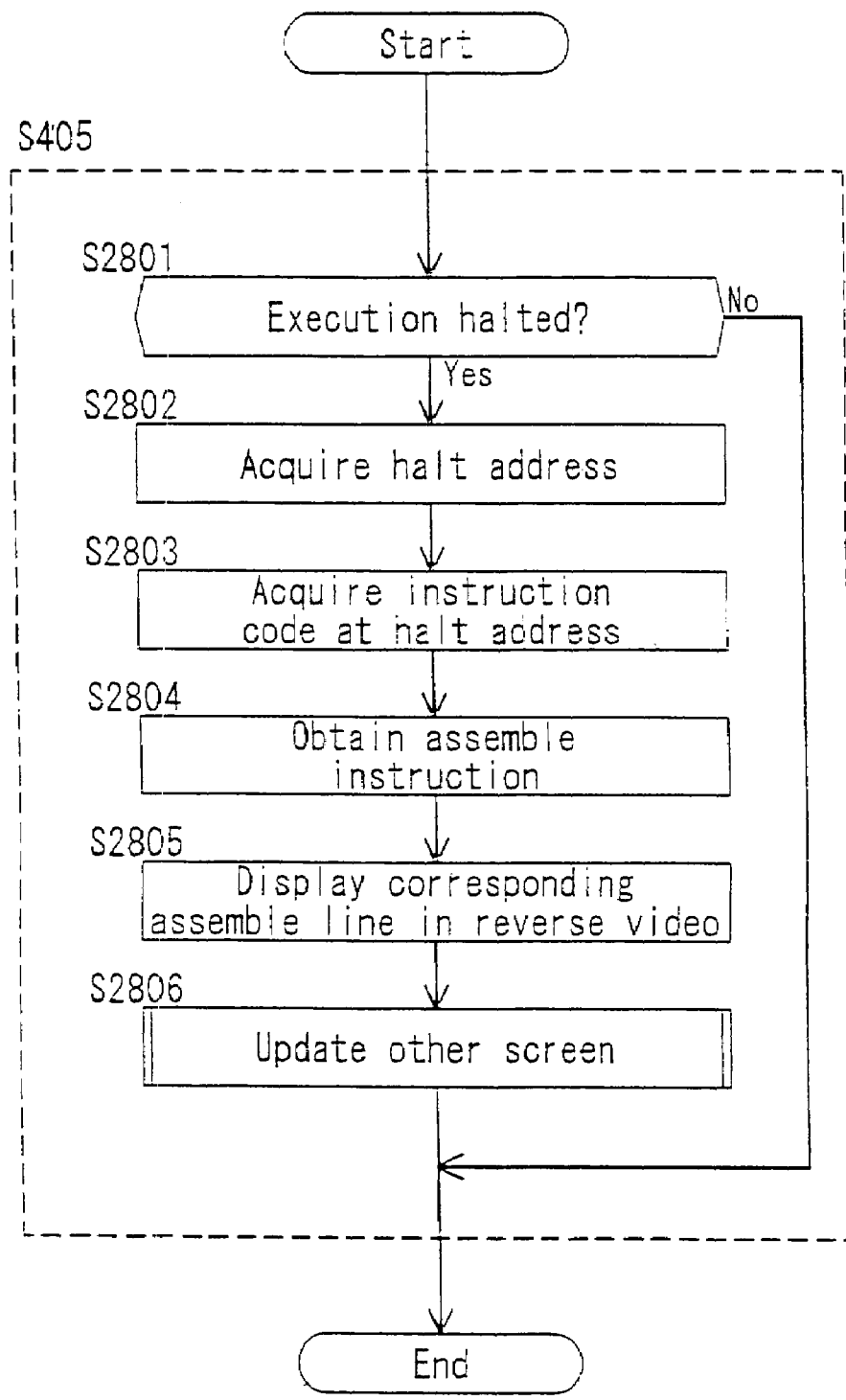
FIG. 29 is a flow diagram of a display update process according to the prior art.

FIG. 23 shows the process flow of the display update process in step S405 according to the present embodiment.

In step S2301, the execution state of the program being debugged is examined on the execution target environment 302, and if the execution is halted, the process proceeds to step S2302. If the execution of the program is not halted, but is continuing, the process is terminated since there is no need to update the display. On the other hand, if the execution is halted, the following steps are carried out to produce a display indicating to the program developer at which point in the program being debugged the execution is caused to halt.

In step S2302, the halt address of the program being debugged is acquired.

Next, in step S2303, by referring to the flag live range information 2101, live range information containing the current execution halt address is retrieved for all the condition flags.

Then, in step S2304, the value of every condition flag whose live range contains the current execution halt address is acquired from the execution target environment 302.

In step S2305, the current address range to be displayed is obtained, and the following process is repeated for each address, starting from the first address of the address range and ending at the last address. When the process is completed for all the addresses to be displayed, the process is terminated. The current address range to be displayed means the range containing a predetermined number of lines (which is determined by the number of lines displayable in the window) before and after the current halt address, for example, in the code window in which the source code is displayed; this information is managed by a section (within the debugger processing section 301) that produces a display in the debugger 204C.

Next, in step S2306, by referring to the object code information 303 stored in the debugger, based on the address to be displayed, the instruction code at the corresponding address is read out.

In step S2307, the instruction code is disassembled to obtain an assemble line character string corresponding to the instruction code. The disassembling is done by referring to the instruction type information 305 managed in the debugger.

Next, in step S2308, by referring to the instruction type information 305 managed in the debugger, based on the instruction code, it is determined whether the instruction is a conditional execution instruction. If it is a conditional execution instruction, the process proceeds to step S2309. If it is not a conditional execution instruction, the process proceeds to step S2313.

In step S2309, by referring to the live range information obtained in step 2303, it is determined whether the condition flag is valid at the current address to be displayed. That is, it is determined whether the condition flag value acquired in step S2304 is valid or not. If the flag is within the live range, the process proceeds to step S2310; otherwise, the process proceeds to step S2314.

In step S2310, the condition flag value acquired in step S2304 is referred to.

In step S2311, by referring to the condition flag value, it is determined whether the conditional execution instruction is to be executed or not. If it is to be executed, the process proceeds to step S2313, but if it is not to be executed, the process proceeds to step S2312.

If the conditional execution instruction is not to be executed, in step S2312 the operation part not executed is displayed in dim gray color. Further, if the address to be displayed is the execution halt address, the condition flag part is displayed in reverse video.

In step S2313, if the address to be displayed is the execution halt address, the corresponding assemble line character string is displayed in reverse video. If the address to be displayed is not the execution halt address, it remains displayed in normal video.

In step S2314, since the condition flag value acquired in step S2304 is not valid, it cannot be determined whether or not the conditional execution instruction is to be executed; therefore, it is displayed in normal video with an underline (that is, in undetermined format).

Next, the process returns to step S2305, to repeat the process for the address range of the display area.

FIGS. 24A to 24D show display examples. In FIGS. 24A to 24D, the unexecuted operation part to be displayed in dim gray color is shown as being enclosed within a rectangular box for convenience of illustration, but actually, it is displayed in dim gray color, not within a box.

As described above, according to the present embodiment, when the execution of the program being debugged is halted at a breakpoint, then by acquiring the condition flag value at that instant in time and by examining addresses within the live range of the condition flag, the determination as to whether the conditional execution instruction is to be executed or not is made not only for the execution halt address but also for the addresses before and after it, and the results are displayed by changing the display method; in this way, the conditional execution logic implemented by the conditional execution instruction can be displayed in an easy-to-view form, and the user can thus debug the program while viewing the executing process of the program being debugged.

In the present embodiment, when the conditional execution instruction is not to be executed, in step S2312 the operation part not executed is displayed in dim gray color, but the method of display is not limited to this particular example; alternatively, strikeout lines may be written over the unexecuted part, or the unexecuted part may be displayed in smaller fonts or overwritten with a character string "Not Executed".

The machine readable recording medium described in the ninth invention is the object file 203 according to the third embodiment, and differs from the earlier described object file by the inclusion of the flag live range information (1709).

The machine readable recording medium described in the ninth invention is the object file 203 according to the third embodiment, and differs from the earlier described object file by the inclusion of the flag life range information (1709).

As described above, according to the present invention, by acquiring the execution condition flag value for a conditional execution instruction, the contents of the processing actually executed by the conditional execution instruction can be discriminated, and the executing process of the program can be presented to the user in an easy-to-view form.

What is claimed is:

1. A software debugger tangibly incorporated on a computer-readable medium that displays a microcomputer program being debugged, the software debugger providing the functions of:
    determining whether an instruction of the microcomputer program is a conditional execution instruction;
    acquiring a condition flag value for the instruction if the instruction is determined to be a conditional execution instruction;
    determining whether to execute the conditional execution instruction based on the acquired condition flag value; and
    displaying the instruction on a viewing screen according to a first method of display if the conditional execution instruction is executed and according to a second method of display if the conditional execution instruction is not executed.

2. The software debugger of claim 1, wherein the address of the conditional execution instruction is displayed on the viewing screen in reverse video for one of the first and second methods of display.

3. The software debugger of claim 1, wherein the address of the conditional execution instruction and the condition flag value are displayed on the viewing screen in reverse video for one of the first and second methods of display.

4. A software debugger tangibly incorporated on a computer-readable medium that displays a microcomputer program being debugged, the software debugger providing the functions of:
    updating a flag value that is associated with a conditional execution instruction of the microcomputer program in accordance with an executed flag update instruction of the microcomputer program;
    determining whether to execute a conditional execution instruction of the microcomputer program based on the updated flag value; and
    outputting trace information of the conditional execution instruction according to a first method if the conditional execution instruction is executed and according to a second method if the conditional execution instruction is not executed.

5. A software development support system tangibly incorporated on a computer-readable medium that displays a microcomputer program being debugged, the software development support system providing the functions of:
    determining whether a life range is active for a condition flag associated with a conditional execution instruction of the microcomputer program;
    determining, based on the value of the condition flag, whether to execute the conditional execution instruction if the life range is determined to be active; and
    displaying the conditional execution instruction on a viewing screen according to: (i) a first method of display if the conditional execution instruction is executed, (ii) a second method of display if the life range of the condition flag is determined to be active but the conditional execution instruction is not executed, and (iii) a third method of display if the life range of the condition flag is determined not to be active.

6. A software debugger tangibly incorporated on a computer-readable medium that displays a microcomputer program being debugged, the software debugger providing the functions of:
    determining whether a life range is active for a condition flag associated with a conditional execution instruction of the microcomputer program;
    determining, based on the value of the condition flag, whether to execute the conditional execution instruction if the life range is determined to be active; and
    displaying the conditional execution instruction on a viewing screen according to: (i) a first method of display if the conditional execution instruction is executed, (ii) a second method of display if the life range of the condition flag is determined to be active but the conditional execution instruction is not executed, and (iii) a third method of display if the life range of the condition flag is determined not to be active.

7. The software debugger of claim 6, that further performs the functions of:
    receiving information of the condition flag's life range from a microcomputer compiler;
    detecting the life range of the condition flag within the received information; and
    outputting information of the detected life range of the condition flag.

* * * * *